(12) United States Patent
Teranuma et al.

(10) Patent No.: US 7,185,133 B2
(45) Date of Patent: Feb. 27, 2007

(54) DATA PROCESSOR

(75) Inventors: Tadashi Teranuma, Kodaira (JP);
Hironobu Hasegawa, Koganei (JP);
Kunihiko Nishiyama, Nakano (JP);
Yoshihiko Tsuchihashi, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 58 days.

(21) Appl. No.: 11/142,258

(22) Filed: Jun. 2, 2005

(65) Prior Publication Data

US 2005/0273538 A1 Dec. 8, 2005

(30) Foreign Application Priority Data

Jun. 4, 2004 (JP) ............................. 2004-166529

(51) Int. Cl.
*G06F 13/36* (2006.01)
*G06F 12/00* (2006.01)

(52) U.S. Cl. ..................................... 710/309; 710/240
(58) Field of Classification Search ................. 710/22, 710/107, 240
See application file for complete search history.

(56) References Cited

U.S. PATENT DOCUMENTS

| | | | |
|---|---|---|---|
| 6,112,016 A * | 8/2000 | MacWilliams et al. | 710/107 |
| 6,148,356 A * | 11/2000 | Archer et al. | 710/307 |
| 6,219,724 B1 * | 4/2001 | Kim et al. | 710/22 |
| 6,490,644 B1 * | 12/2002 | Hyde et al. | 710/125 |
| 6,502,157 B1 * | 12/2002 | Batchelor et al. | 710/310 |
| 6,829,669 B2 * | 12/2004 | Jahnke et al. | 710/306 |
| 6,850,995 B1 * | 2/2005 | Shishizuka et al. | 710/20 |
| 6,976,108 B2 * | 12/2005 | Kim et al. | 710/240 |
| 2002/0138678 A1 * | 9/2002 | Kim et al. | 710/240 |
| 2002/0183956 A1 * | 12/2002 | Nightingale | 702/120 |
| 2003/0048677 A1 | 3/2003 | Muneno | |
| 2003/0227637 A1 * | 12/2003 | Tanaka | 358/1.3 |

* cited by examiner

*Primary Examiner*—Rehana Perveen
*Assistant Examiner*—Mohammed H. Rehman
(74) *Attorney, Agent, or Firm*—Antonelli, Terry, Stout and Kraus, LLP.

(57) ABSTRACT

A data processor has a first bus master module, first bus slave module and first bus right arbitrating circuit connected to a first bus, a second bus master module, second bus slave module and second bus right arbitrating circuit connected to a second bus, and a bus bridge circuit connecting the first and second buses. The bus bridge circuit has a first transfer controller, responsive to an access request from the first bus to the second bus, for obtaining a bus right of the second bus, and a second transfer controller, responsive to an access request from the second bus to the first bus, for obtaining a bus right of the first bus. The second bus has a first path connecting the second bus slave module and the first transfer controller and a second path connecting the second bus master module and the second transfer controller.

19 Claims, 20 Drawing Sheets

DATA PROCESSOR

CROSS-REFERENCE TO RELATED APPLICATION

The present application claims priority from Japanese patent application No 2004-166529, filed on Jun. 4, 2004, the content of which is hereby incorporated by reference into this application.

BACKGROUND OF THE INVENTION

The present invention relates in general to a technique for use in controlling a bus of a data processor having a multi-bus configuration in which plural bases are connected by a bus bridge circuit; and, more particularly, the invention relates, for example, to a technique that is effective when applied to a microcomputer in which a processor core and an image processing module are connected to different buses.

Japanese Unexamined Patent Publication No. 2003-85127 (Patent Document 1) discloses a dual bus system in which peripheral bridges are provided, so that a bus master connected to a low-speed bus and a bus master connected to a high-speed bus can simultaneously occupy the buses. An external memory is connected to a first bus via an external bus controller, another memory is connected to a second bus via an external memory controller, and a bus master of the first bus can access the other memory via an external memory controller on the second bus side.

SUMMARY OF THE INVENTION

The inventors herein have examined, for example, the bus configuration of a microcomputer (microprocessor, data processor) on which a processor core, an image processing module, and the like (a plurality of circuit modules) are mounted. When the image processing module and the processor core are connected to the same bus, transfer of a large amount of image data or the like is needed in association with image processing. Due to contention over a single bus between a command fetch by the processor core and image data transfer by the image processing module, any improvement in data processing performance is limited.

Employment of a multi-bus configuration in which the bus connected to the processor core is separated from the bus connected to the image processing module, and the buses are connected via a bus bridge, was examined as follows. The examination explained below is not described in Patent Document 1.

First, a countermeasure against contention by the bus bridge circuit was examined. Specifically, it is desirable from the viewpoint of sharing data or sharing a system resource to enable the bus master of one of the buses to access a bus slave of another bus in the multi-bus configuration. When contention of access requests from both sides occurs, the occurrence of a dead lock due to contention of access requests between the buses cannot be suppressed only by a bus arbiter of each bus.

Second, a countermeasure for increasing the speed of external parallel accesses against restriction on the number of external terminals was examined. Specifically, even when employing a circuit configuration in which a bus controller is provided for each of the buses in a multi-bus configuration and an external bus access can be performed individually, due to limitation of the number of external terminals of the data processor, the number of parallel data bits for inputting/outputting data from/to the outside is limited. In the case of processing a large amount of image data, it is preferable to access an external memory at high speed. The inventors of the present invention have found that it is useful to selectively increase the number of bits of parallel access to external memories.

An object of the present invention is to provide a data processor that is capable of handling a situation in which access requests contend with each other among internal buses of a multi-bus configuration.

Another object of the present invention is to provide a data processor that is capable of improving the efficiency of access from an internal bus in a multi-bus configuration to the outside.

The above and other objects and novel features of the present invention will become more apparent from the following description in this specification and the appended drawings.

An outline of representative aspects of the invention as disclosed in this application will be briefly described as follows.

1. Method of Avoiding Access Contention Among Internal Buses

A data processor according to the present invention comprises: a first bus (15); a first bus master module (40) connected to the first bus; a first bus slave module (5) connected to the first bus; a second bus (16); a second bus master module (41) connected to the second bus; a second bus slave module (24, 46) connected to the second bus; a bus bridge circuit (2) connecting the first and second buses; a first bus right arbitrating circuit (13) connected to the first bus; and a second bus right arbitrating circuit (28) connected to the second bus. The bus bridge circuit has: a first transfer controller (42) for obtaining a bus right of the second bus in response to an access request directed from the first bus to the second bus and performing transfer control on information of the request; and a second transfer controller (43) for obtaining a bus right of the first bus in response to an access request directed from the second bus to the first bus and performing transfer control on information of the request. The second bus has first and second paths which can be split, the first path connecting the second bus slave module and the first transfer controller, and the second path connecting the second bus master module and the second transfer controller. With this configuration, the bus bridge circuit can transmit a bus access request sent from one internal bus to the other internal bus. Since the first and second paths are separated from each other, when an access request from the first bus master module to the second bus slave module and an access request from the second bus master module to the first bus slave module contend with each other, by giving priority to the access request from the first path, a dead lock caused by the contention can be prevented.

For example, the second bus has a first split bus (16A) connected to the first transfer controller, a second split bus (16B) connecting the second bus master module and the second transfer controller, a third split bus (16C) connected to the second bus slave module, and a split bus connection selecting circuit (47) for selectively connecting either the first or second split bus to the third split bus. The first path includes the first split bus, the split bus connection selecting circuit, and the third split bus, and the second path includes the second split bus. When an access request from the first bus master module to the second bus slave module and an access request from the second bus master module to the first bus slave module contend with each other, the transmission path of the access requests can be split by the first and second split buses. By giving priority to the access request from the first bus master module in an algorithm, collision with the other access request can be avoided and a dead lock can be suppressed.

As a procedure for splitting the transmission path of the competing access requests, for example, when a bus right request via the first transfer controller and a bus right request from the second bus master module contend with each other, the second bus right arbitrating circuit places priority on the bus right request via the first transfer controller, and causes the split bus connection selecting circuit to select a connection state in which the first split bus is connected to the third split bus. For example, in the case where the first bus master module is a processor core, and the second bus master module is an image processing module, the processor core can set and rewrite control data for image processing prior to the process of the image processing module.

The first bus slave is a first bus controller (5) for receiving an access request transmitted on the first bus and for controlling a first external bus, and the second bus slave module is a second bus controller (24) for receiving an access request transmitted on the second bus and for controlling a second external bus.

2. Parallel Access to Plural External Buses

In another specific example of the data processor, an external bus connection selecting circuit (37), which is capable of selecting a connection state between the first and second bus controllers and an external bus, is employed. The external bus connection selecting circuit can select a first connection state in which the first external bus is connected to the first bus controller and the second external bus is connected to the second bus controller, or a second connection state in which the first and second external buses are connected to the second bus controller, and the first and second external buses are not connected to the first bus controller. In the second connection state, the second bus controller can perform a parallel access control and an individual access control on the first and second external buses. In short, when the second connection state is selected, the first or second bus master can access a memory (35) adapted to be coupled to the first external bus and a memory (36) adapted to be coupled to the second external bus in parallel. For example, two memories having n bits as the number of data input/output bits and which are connected to different external buses are operated in parallel, and a parallel data access of 2×n bits of the number of data input/output bits can be made. The efficiency of access from an internal bus in a multi-bus configuration to the outside can be improved.

From the viewpoint of control on the external bus connection selecting circuit, the bus bridge circuit has a first operation mode (32-bit bus mode); and, in the first operation mode, in response to an access request given from the processor core to the first external bus, transfers information related to the access request to the second internal bus, and the external bus connection selecting circuit is set in the second connection state in response to the first operation mode. When the second connection state is set in such a manner, the second bus controller may perform parallel access control when a specific address area is designated by an access request from the processor core or image processing module, and it may perform individual access control when other address areas related to an external bus are designated.

In the first connection state, the first bus controller can perform individual access control on the first external bus, and the second bus controller can perform individual access control on the second external bus.

The bus bridge circuit has a register (44), and, by setting a predetermined value in the register, the first operation mode is designated. Thus, the first operation mode can be set programmably via the processor core or the like.

3. Parallel Access to Plural External Buses

From the viewpoint of placing importance on parallel access on a plurality of external buses, a data processor comprises: a plurality of bus masters; a plurality of external bus control circuits to which an access request is given from the bus masters; and an external bus connection selecting circuit capable of selecting a state of connection between the plurality of external bus control circuits and the external buses. The external bus connection selecting circuit can select a first connection state in which a peculiar external bus is connected to each of the external bus control circuits or a second connection state in which external buses peculiar to the external bus control circuits are commonly connected to a predetermined external bus control circuit in the plurality of external bus control circuits. In the second connection state, the predetermined external bus control circuit can perform parallel access control and individual access control on the external buses peculiar to the plurality of external bus control circuits. With this configuration, when the second connection state is selected, the predetermined external bus control circuit can access memories of the plurality of external buses in parallel, and the efficiency of access from an internal bus of a multi-bus configuration to the outside can be improved.

In a specific example of the present invention, the plurality of external bus control circuits can perform individual access control on the peculiar external buses in the first connection state.

In another specific example of the present invention, the predetermined external bus control circuit performs parallel access control when a specific address area is designated by an access request from the bus master, and it performs individual access control when other address areas related to the external buses are designated.

In yet another specific example, the data processor further comprises a plurality of internal buses connected via a bus bridge circuit. The bus master and the external bus control circuit are connected to each of the internal buses, and the number of bits of the internal bus is many times larger than that of the external bus.

In yet another specific example, the bus bridge circuit has a first operation mode; and, in the first operation mode, in response to an access request given from an internal bus, other than an internal bus connected to the predetermined external bus control circuit, to an external bus peculiar to an external bus control circuit corresponding to the internal bus, the bus bridge circuit transfers information related to the access request to the internal bus connected to the predetermined external bus control circuit. The external bus connection selecting circuit is set in the second connection state in response to the first operation mode.

4. Parallel Access to Plural External Buses

From the viewpoint of placing importance on parallel access on a plurality of external buses, a data processor comprises: a first bus (15) having 2n bits as the number of parallel data bits; a first bus master (40) connected to the first bus; a first bus controller (5) which is capable of receiving an access request to be transmitted to the first bus and of controlling a first external bus (31) having n bits as the number of parallel data bits; a second bus (16) having 2n bits as the number of parallel data bits; a second bus master (41) connected to the second bus; a second bus controller (24) which is capable of receiving an access request to be transmitted to the second bus and of controlling a second external bus (32) having n bits as the number of parallel data bits; and an external bus connection selecting circuit (37) which is capable of selecting a first connection state in which the first external bus is connected to the first bus controller and is disconnected from the second bus controller, or a second connection state in which the first external bus is connected to the second bus controller and is disconnected from the first bus controller. In the second selection state of the external bus connection selecting circuit, the second bus controller can access a memory of the first external bus and a memory of a second external bus in parallel in response to an external bus access request of 2n bits as a data access size from the first or second bus master.

In the second connection state of the external bus connection selecting circuit, the second bus controller can access the memory of the first external bus or the memory of the second external bus in response to an external bus access request of n bits as a data access size from the first or second bus master. In the first connection state of the external bus connection selecting circuit, the first bus controller can access the memory of the first external bus in response to an external bus access request of n bits as a data access size from the first bus master, and the second bus controller can access the memory of the second external bus in response to an external bus access request of n bits as a data access size from the second bus master.

In still another specific example of the present invention, the bus bridge circuit has a first operation mode; and, in the first operation mode, in response to an access request given from the first bus master to a first external bus, the bus bridge circuit transfers information related to the access request to an internal bus connected to the second bus controller, and the external bus connection selecting circuit is set in the second connection state in response to the first operation mode. For example, the first bus master is a processor core, the second bus master is an image processing module, and the processor core can set control information in the image processing module.

Effects obtained by the representative aspects of the invention disclosed in this application will be briefly described as follows.

The invention can handle a state where access requests contend with each other among internal buses of a multi-bus configuration. Thus, the efficiency of access from an internal bus in a multi-bus configuration to the outside can be improved.

DETAILED DESCRIPTION OF THE PREFERRED EMBODIMENTS

Microcomputer

Figure 1:
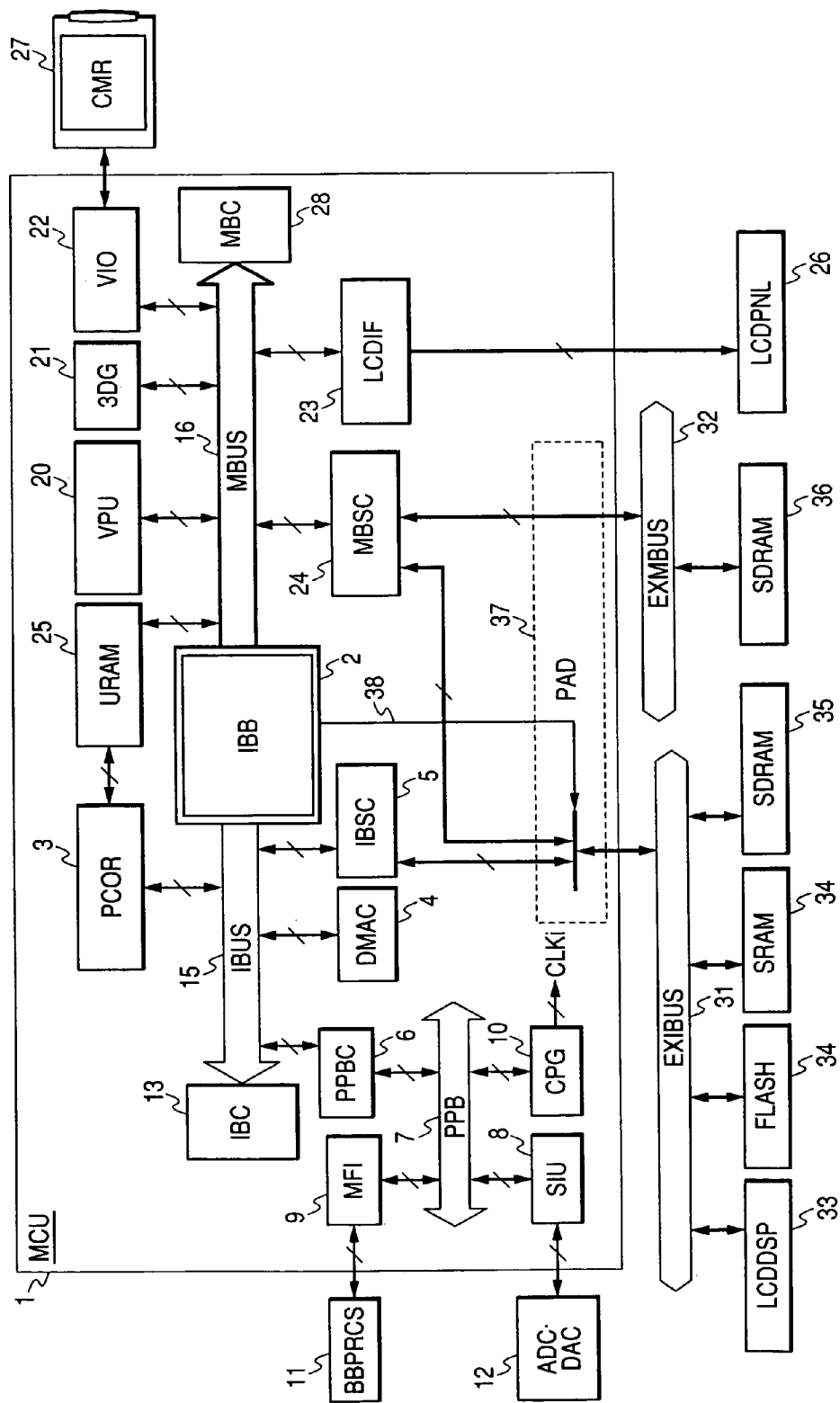
FIG. 1 is a block diagram showing a microcomputer according to an embodiment of the invention.

FIG. 1 shows a microcomputer which represents an embodiment of the present invention. The microcomputer shown in FIG. 1 is, although not limited, formed on a single semiconductor substrate made of single crystal silicon or the like by a known semiconductor integrated circuit manufacturing technique, such as CMOS (complementary MOS), and is used by being mounted as an application processor tailored to image processing and voice processing on a cellular phone or the like.

A microcomputer (MCU) 1 has an internal bus (IBUS) 15 operating as a first bus and a media bus (MBUS) 16 operating as a second bus, which bases are connected to each other via a bus bridge circuit (IBB) 2. The internal bus 15 has a processor core (PCOR) 3 and a direct memory access controller (DMAC) 4 which serve as bus masters for controlling, for example, the whole microcomputer 1. The processor core (PCOR) 3 includes a central processing unit (CPU) and a digital signal processor (DSP). It is sufficient for the processor core (PCOR) 3 to include at least a CPU 2. To the internal bus 15, as bus slaves, an external memory controller (IBSC) 5 and a peripheral bus controller (PPBC) 6 are connected. Further, the peripheral bus controller (PPBC) 6 is connected, via a periphery bus (PPB) 7, to a sound interface unit (SIU) 8 typified as a voice processing module, a multifunctional interface (MFI) 9, and a clock pulse generator (CPG) 10. The multifunctional interface 9 is connected to a semiconductor integrated circuit (BBPRCS) 11 for baseband processing and has the functions of a common memory and the like. The sound interface unit (SIU) 8 is connected to an analog/digital converter (ADC) and digital/analog converter (DAC) 12. The clock pulse generator 10 generates a plurality of clocks CLKi which are used as a sync clock in the microcomputer 1, an access sync clock of an external memory, and the like. The microcomputer 1 has a bus arbiter (IBC) 13 which serves as a bus right arbitration circuit of the internal bus 15.

The media bus 16 has, as bus modules, for example, a video processing unit (VPU) 20, a 3D graphic accelerator (3DG) 21, a video interface unit (VIO) 22, a liquid crystal display interface unit (LCDIF) 23, and the like. To the media bus 16, as bus slave modules, an external memory controller (MBSC) 24 and a built-in memory (URAM) 25 are connected. To the liquid crystal display interface 23, a dot-matrix-type liquid crystal display panel (LCDPNL) 26 is connected. To the video interface 22, a CCD camera (CMR) 27 is connected. As a bus right arbitration circuit of the media bus 16, a bus arbiter (MBC) 28 is provided. The built-in memory (URAM) 25 is also connected to the processor core 3 and is used as a work area of the CPU, a data buffer, or the like.

The bus masters 3 and 4 output a bus request signal to the bus arbiter 13 at the time of requesting the bus right of the internal bus (IBUS) 15. The bus arbiter 13 arbitrates so that different access operations do not contend with each other on the IBUS 15 for conflicting access requests, sends back a bus acknowledge to one bus request, and gives the bus right to the requester of the bus request. The bus masters 20 to 23 and the like output a bus request signal to the bus arbiter 28 at the time of requesting the bus right of the media bus (MBUS) 16. The bus arbiter 28 arbitrates so that different access operations do not contend with each other on the MBUS 16 for conflicting access requests, sends back a bus acknowledge to one bus request, and gives the bus right to the requester of the bus request.

The bus bridge circuit 2 passes the access request from the IBUS 15 side to the MBUS 16 side, passes the access request from the MBUS 16 side to the IBUS 15 side, and transfers access data between the IBUS 15 and the MBUS 16. Therefore, at the time of passing an access request from the IBUS 15 to the MBUS 16 side, the bus bridge circuit 2 functions as a bus master on the MBUS 16 side. On the contrary, at the time of passing an access request from the MBUS 16 to the IBUS 15 side, the bus bridge circuit 2 functions as a bus master on the IBUS 15 side.

The microcomputer 1 has a plurality of interface terminals (not shown) which can be connected to a first external bus (EXIBUS) 31 and a second external bus (EXMBUS) 32. The external memory controllers 5 and 24 control the external buses 3 and 32, respectively. In a state where the operation of the external memory controller 5 is suppressed, the other external memory controller 24 can access both of the buses 31 and 32 in parallel. An external bus connection selecting circuit (PAD) 37 selectively connects the external bus 31 to the external memory controller 5 or the other external memory controller 24. A selection signal 38 of the external bus connection selecting circuit (PAD) 37 is supplied from the IBB 2. To the EXIBUS 31, a segment-display-type LCD display (LCDDSP) 33, a clock asynchronous memory 34 such as a flash memory (FLASH) or static random access memory (SRAM), and an SDRAM (Synchronous Dynamic Random Access Memory) 35 serving as a clock-synchronous-type memory are connected. To the external bus 32, an SDRAM 36 serving as a clock-synchronous-type memory is connected. The SDRAM 35 is dedicated to an application such that it is accessed in parallel with the SDRAM 36 of the external bus 32 by the external memory controller 24 in a 32-bit bus mode, which will be described later. The SDRAM 35 is mapped in the same address as that of the SDRAM 36.

In the microcomputer 1, for example, the PCOR 3 accesses the asynchronous memory 34 via the IBSC 5 connected to the IBUS 15. The VPU 20 and the 3DG 21 access the SDRAM 36 only, or both the SDRAMs 35 and 36 in parallel, via the MBSC 24 connected to the MBUS 16. The SDRAMs 36 and 35 are used as work memories or frame buffers by image processing modules, such as the VPU 20 and 3DG 21. The PCOR 3 has an MFI mode for starting a desired program by using a common RAM provided in the MFI 9. When the BBPRCS 11 writes a program directly in the common RAM in the MFI 9 and sends an interrupt request to the CPU of the PCOR 3, the CPU reads the written program from the common RAM in the MFI 9. By an interrupt process similar to the one described above, data written in the MFI 9 can be transferred to the asynchronous memory 34, URAM 25, or the like. The MFI mode can be used, for example, in the case of executing an application downloaded from the WEB or the like.

Basic Mode of Bus Access

Figure 2:
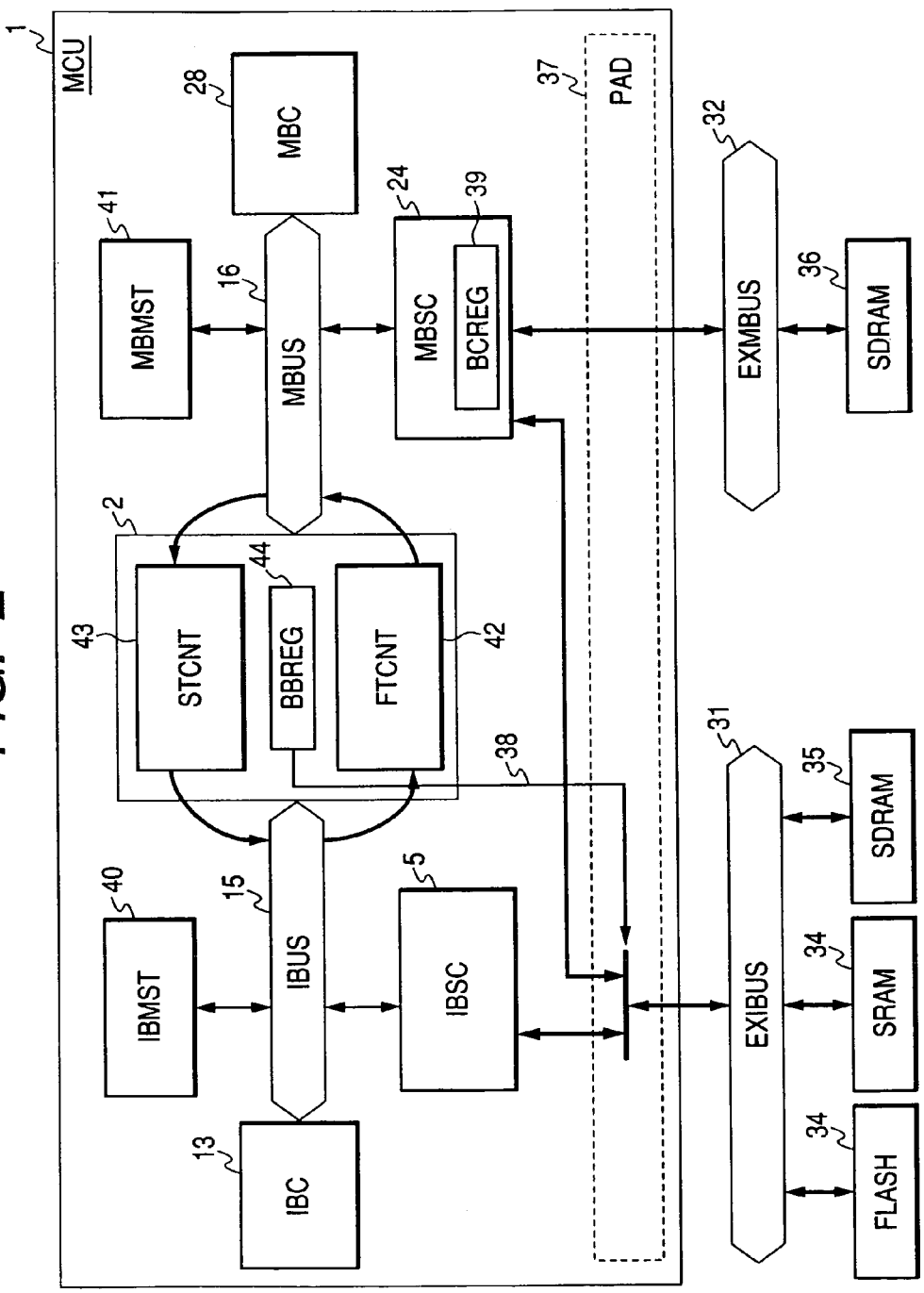
FIG. 2 is a block diagram showing a bus configuration, with attention being directed to the configuration of a bus bridge circuit and a PAD in the microcomputer of FIG. 1.

FIG. 2 shows a bus configuration, with attention being directed to the configuration of the bus bridge circuit 2 and the PAD 37 in the microcomputer 1.

In FIG. 2, an I bus master (IBMST) 40 generically indicates bus masters, such as the PCOR 3 and the DMAC 4, that are connected to the IBUS 15, and an M bus master (MBMST) 41 generically indicates bus masters, such as the VPU 20, 3DG 21, and VIO 22, that are connected to the MBUS 16.

The bus bridge circuit 2 has a first transfer controller (FTCNT) 42, a second transfer controller (STCNT) 43, and a bus bridge control register (BBREG) 44.

The first transfer controller (FTCNT) 42 obtains the bus right of the MBUS 16, in it response to an access request sent from the IBUS 15 to the MBUS 16 and executes transfer control based on the information for the request. The first transfer controller 42 has an address decoder, a command decoder, a data buffer, and a transfer control logic. The address decoder decodes an access address included in the access request on the IBUS 15 and determines whether or not the address is included in an address area requiring transfer between the IBUS 15 and the MBUS 16. In the case where transfer between the IBUS 15 and the MBUS 16 is required, the command decoder decodes an access command included in the access request on the IBUS 15 and makes the transfer control logic control an operation that is necessary for the transfer between the buses. The data buffer is used as a buffer area for storage of an access request and access data transferred between the buses.

The second transfer controller (STCNT) 43 obtains the bus right of the IBUS 15 in response to an access request sent from the MBUS 16 to the IBUS 15, and it executes transfer control based on the information for the request. The second transfer controller 43 also has an address decoder, a command decoder, a data buffer, and a transfer control logic similar to the first transfer controller 42 described above. The address decoder decodes an access address included in the access request on the MBUS 16, and it determines whether or not the address is included in an address area requiring transfer between the IBUS 15 and the MBUS 16. In the case where transfer between the IBUS 15 and the MBUS 16 is required, the command decoder decodes an access command included in the access request on the MBUS 16 and makes the transfer control logic control an operation that is necessary for the transfer between the buses. The data buffer is used as a buffer area for storage of an access request and access data transferred between the buses.

The bus bridge control register 44 determines an operation mode of the first and second transfer controllers 42 and 43 in accordance with a value which is set in the bus bridge control register 44, and, according to the operation mode, it determines the value of the selection signal 37. The operation mode will be described later as an external bus access mode.

The bus access modes carried out by the microcomputer 1 are roughly divided into first to fourth bus access modes. The first bus access mode is a bus access which does not accompany transfer from the IBMST 40 to the IBUS 15. The second bus access mode is a bus access accompanying transfer from the IBMST 40 to the MBUS 16. The third bus access mode is a bus access which does not accompany transfer from the MBMST 41 to the MBUS 16. The fourth bus access mode is a bus access accompanying transfer from the MBMST 41 to the IBUS 15.

In the first bus access mode, (1) a bus right request signal (bus request signal) is output from the IBMST 40 to the IBC 13. (2) In response to this request signal, if there is another bus right request, the IBC 13 arbitrates between this bus request signal and the other bus right request, and outputs a bus use permit signal (bus acknowledge signal) to the IBMST 40. (3) The IBMST 40, which has received the bus use permission, outputs an address, a command and, in the case of a write access, write data to the IBUS 15, thereby completing transfer of the access request. In the case of a read access, the IBMST 40 receives read data sent from an object to be accessed. The access address output to the IBUS 15 at this time is not an address in the address area requiring transfer between the buses for the FTCNT 42.

In the second bus access mode, (1) a bus right request signal (bus request signal) is output from the IBMST 40 to the IBC 13. (2) In response to this request signal, if there is another bus right request, the IBC 13 arbitrates between this bus request signal and the other bus right request, and outputs a bus use permit signal (bus acknowledge signal) to the IBMST 40. (3) The IBMST 40, which has received the bus use permission, outputs an address, a command and, in the case of a write access, write data to the IBUS 15, thereby completing transfer of the access request. (4) An access address output to the IBUS 15 is an address in the address area requiring transfer between the buses for the FTCNT 42. The FTCNT 42 decodes the access address and, when it is determined that the access address is an access address requiring transfer between the buses, requests a bus right on the MSUB 16 from the MBC 28. (5) In response to this request, if there is another bus right request, the MBC 28 arbitrates between the requests, and it outputs a bus use permit signal (bus acknowledge signal) to the FTCNT 42. (6) The FTCNT 42, which has received the bus use permission, outputs the address, command and, in the case of a write access, write data to the MBUS 16. In the case of a read access, the FTCNT 42 receives read data sent from the object to be accessed.

In the third bus access mode, (1) a bus right request signal (bus request signal) is output from the MBMST 41 to the MBC 28. (2) In response to the signal, if there is another bus right request, the MBC 28 arbitrates between this bus request signal and the other bus right request, and outputs a bus use permit signal (bus acknowledge signal) to the MBMST 41. (3) The MBMST 40, which has received the bus use permission, outputs an address, a command and, in the case of a write access, write data to the MBUS 16, thereby completing transfer of the access request. In the case of a read access, the MBMST 41 receives read data sent back from an object to be accessed. An access address output to the MBUS 16 is not an address in the address area requiring transfer between the buses for the STCNT 43.

In the fourth bus access mode, (1) a bus right request signal (bus request signal) is output from the MBMST 41 to the MBC 28. (2) In response to this request signal, if there is another bus right request, the MBC 28 arbitrates between the bus request signal and the other bus right request, and outputs a bus use permit signal (bus acknowledge signal) to the MBMST 41. (3) The MBMST 40, which has received the bus use permission, outputs an address, a command and, in the case of a write access, write data to the MBUS 16. (4) An access address output to the MBUS 16 is an address in the address area requiring transfer between the buses for the STCNT 43. The STCNT 43 decodes the access address and, when it is determined that the access address is an access address requiring transfer between the buses, requests a bus right on the ISUB 15 from the IBC 13. (5) In response to this request, if there is another bus right request, the IBC 13 arbitrates between the requests, and it outputs a bus use permit signal (bus acknowledge signal) to the STCNT 43. (6) The STCNT 43 which has received the bus use permission outputs the address, command and, in the case of a write access, write data to the IBUS 15, thereby completing the transfer of the access request. In the case of a read access, the STCNT 43 receives read data sent from the object to be accessed.

External Bus Access Mode

Each of the IBUS 15 and MBUS 16 includes a data bus having a width of 32 bits. Attention is not paid here to the number of bits of each of an address bus and a control bus. Each of the EXIBUS 31 and EXMBUS 32 includes a data bus having a width of 16 bits. The number of bits is smaller than that of an internal bus due to the limitation of the number of external terminals. Under such conditions, the microcomputer 1 has, as external bus access modes, a 16-bit data access mode (16-bit bus mode) and a 32-bit data access mode (32-bit bus mode) which can be switched. In the 16-bit bus mode, the IBSC 5 controls the EXIBUS 31, and the MBSC 24 controls the EXMBUS 32. The memory controllers 5 and 24 operate independently of each other, and a data access of a 16-bit width can be made on the corresponding buses 31 and 32. In the 32-bit bus mode, the MBSC 24 controls the EXIBUS 31 and EXMBUS 32, and it enables a parallel access to the external memories 35 and 36 to be performed on a unit basis of a 32-bit data width obtained by adding the data bus widths of the EXIBUS 31 and EXMBUS 32.

The external bus access mode is determined by the value set in the BBREG 44. In the initial state upon reset, a 16-bit bus mode is designated. After that, according to an access of the CPU, the 16-bit bus mode and a 32-bit bus mode can be arbitrarily set. The PAD 37 selects connection to the IBSC 5 (first connection state) in response to the 16-bit bus mode and connection to the MBSC 24 (second connection state) in response to the 32-bit bus mode. Each of the first address area, requiring transfer by the FTCONT 42 between the IBUS 15 and the MBUS 16, and the second address area, requiring transfer by the STCNT 43 between the IBUS 15 and the MBUS 16, is initially set at the time of reset. When the 32-bit bus mode is selected, an address area assigned to the external bus EXIBUS 31 is assembled in the first address area, and an address area assigned to the external bus EXIBUS 31 is removed from the second address area. In response to this, the address area assigned to the external bus EXIBUS 31 is added as an object to be accessed by an external bus to the MBSC 24. Consequently, all of the accesses to the EXIBUS 31 are made via the MBSC 24. The MBSC 24 has a control register (BCREG) 39 which designates 16 bits or 32 bits as the size of access data in accordance with a mapping address of the SDRAMs 35 and 36. The control register 39 is operated by, for example, a CPU and is not automatically updated interlockingly with the setting of the 32-bit bus mode. Therefore, when the CPU designates the 32-bit bus mode, in the case of accessing the SDRAMs 35 and 36 in the 32-bit data size, the setting to the control register of the MBSC 24 has to be changed. Also, in the case of selecting the 32-bit bus mode, consequently, the 32-bit-data-size access and the 16-bit-data-size access can be switched for the SDRAMs 35 and 36.

Figure 3:
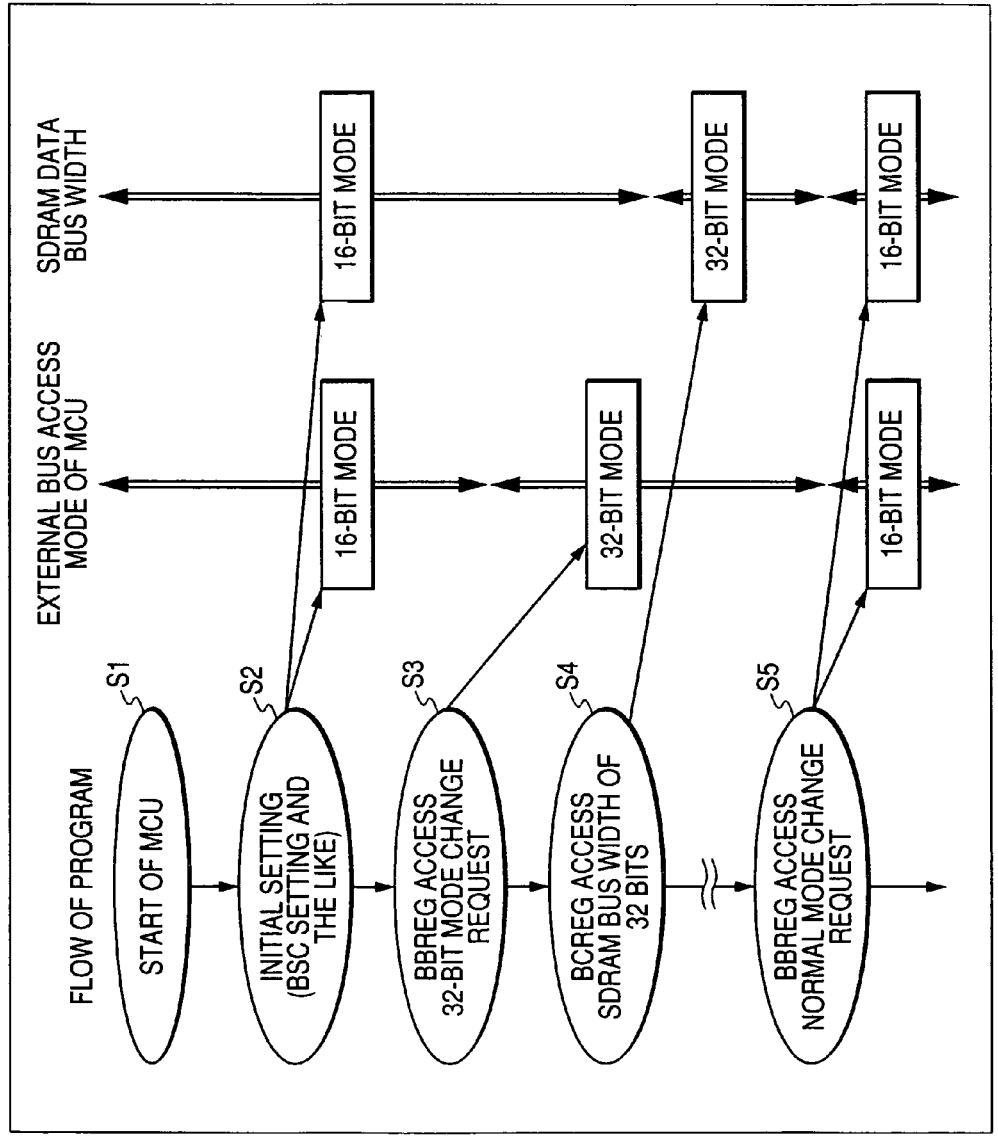
FIG. 3 is a flowchart showing bus access modes and a flow of switching the modes of the microcomputer.

FIG. 3 shows bus access modes of the microcomputer and an operation flow for switching of the modes.

When the MCU 1 is reset at the time of power-on and an instruction execution of the CPU is activated (S1), initial setting of a register value in the BBREG 44 and the like, initial setting of an address area, and the like are performed by a resetting process routine or the like (S2). In this state, the 16-bit bus mode is set as the external access mode of the MCU 1, and the data size of an access to the SDRAMs 35 and 36 is set to 16 bits. When the value of the BBREG 44 is rewritten in the subsequent program execution process by the CPU (S3), the size of the external access mode of the MCU 1 is changed to 32 bits. After that, the value of the control register (BCREG) 39 of the MBSC 24 is changed (S4), thereby changing the data size of an access to the SDRAMs 35 and 36 to 32 bits. Subsequently, the value of the BBREG 44 is reset to the initial value (S5), so that the MCU 1 is changed to the 16-bit bus mode, the value of the control register (BCREG) 39 of the MBSC 24 is also automatically reset to the initial value, and the data size of the access to the SDRAMs 35 and 36 is set to 16 bits.

Figure 4:
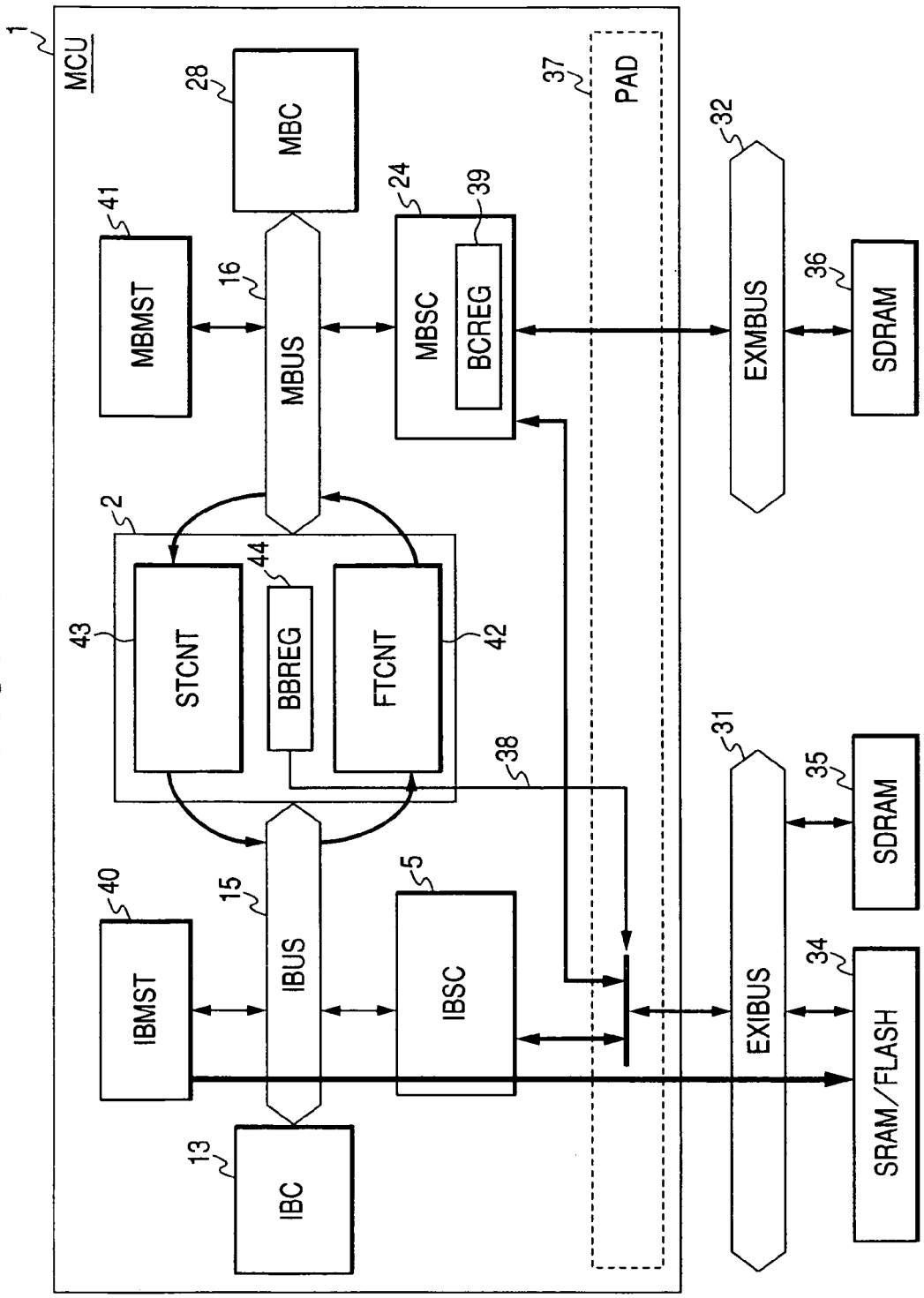
FIG. 4 is a block diagram illustrating an access path used to access an asynchronous memory from an IBMST in a 16-bit bus mode.

FIG. 4 illustrates an access path used to access the asynchronous memory 34 from the IBMST 40 in the 16-bit bus mode.

Figure 5:
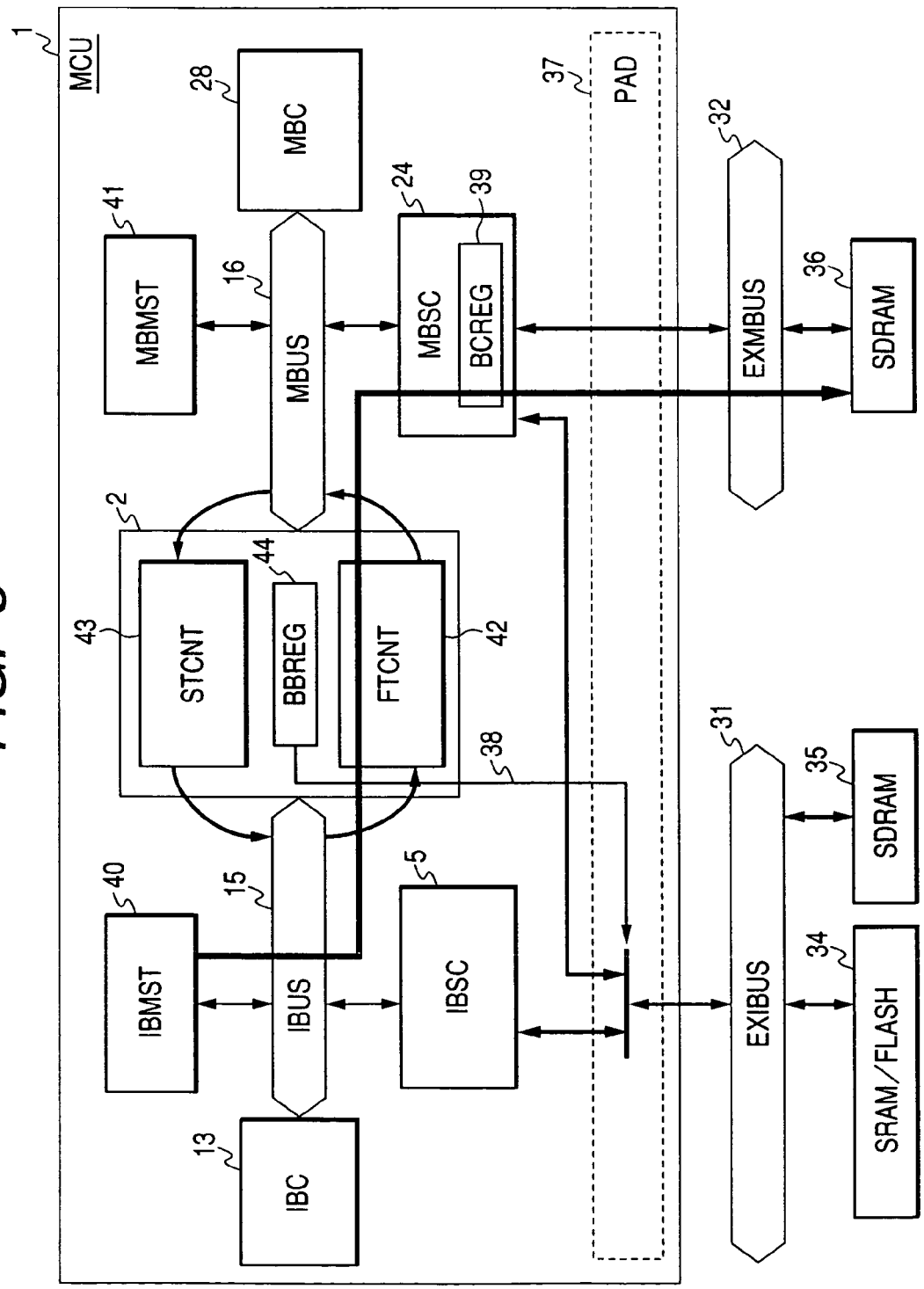
FIG. 5 is a block diagram illustrating an access path used to access an SDRAM from the IBMST via FTCNT in the 16-bit bus mode.

FIG. 5 illustrates an access path used to access the SDRAM 36 from the IBMST 40 via the FTCNT 42 in the 16-bit bus mode.

Figure 6:
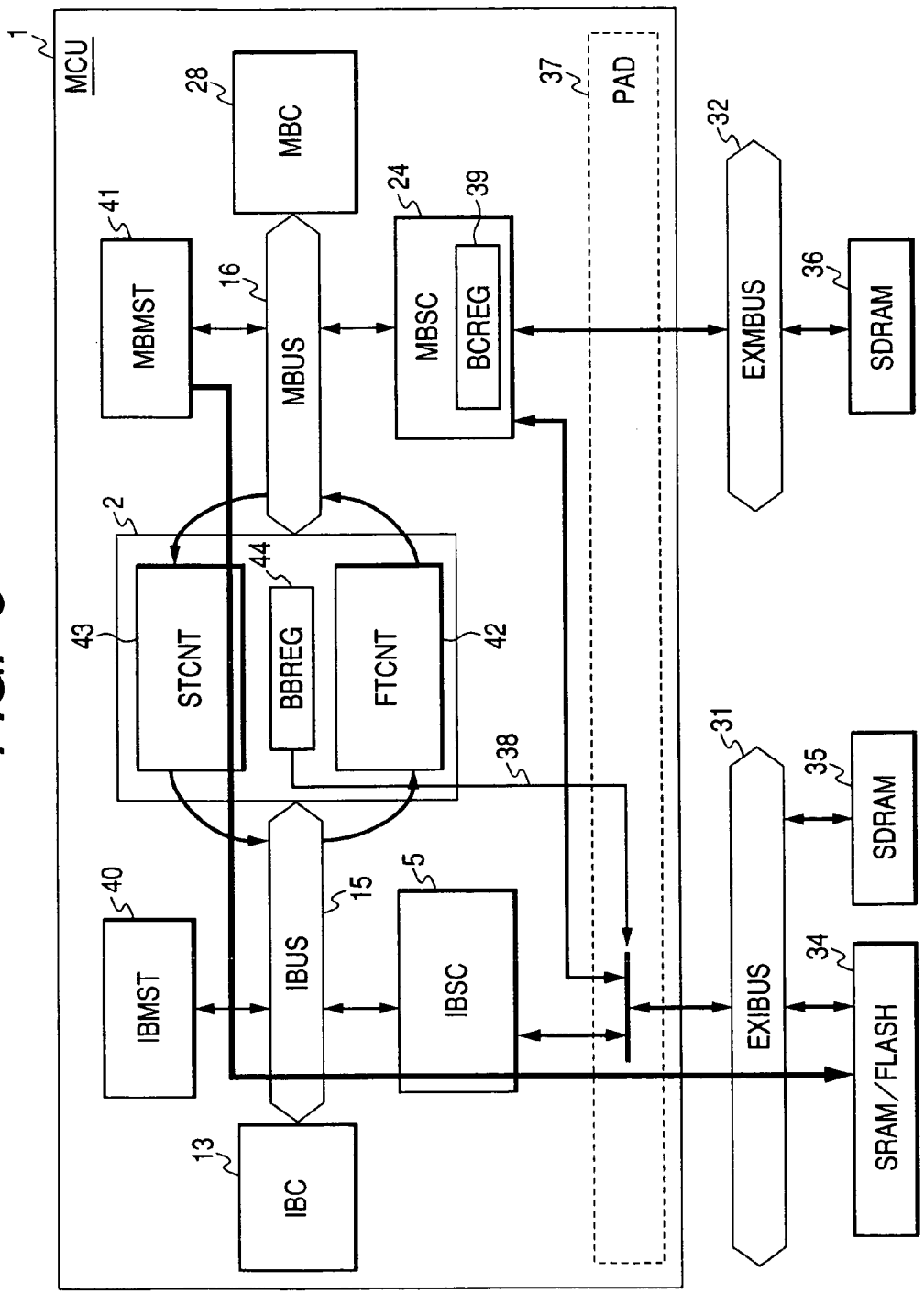
FIG. 6 is a block diagram illustrating an access path at the time of accessing an asynchronous memory from an MBMST via an STCNT in the 16-bit bus mode.

FIG. 6 illustrates an access path used to access the asynchronous memory 34 from the MBMST 41 via the STCNT 43 in the 16-bit bus mode.

Figure 7:
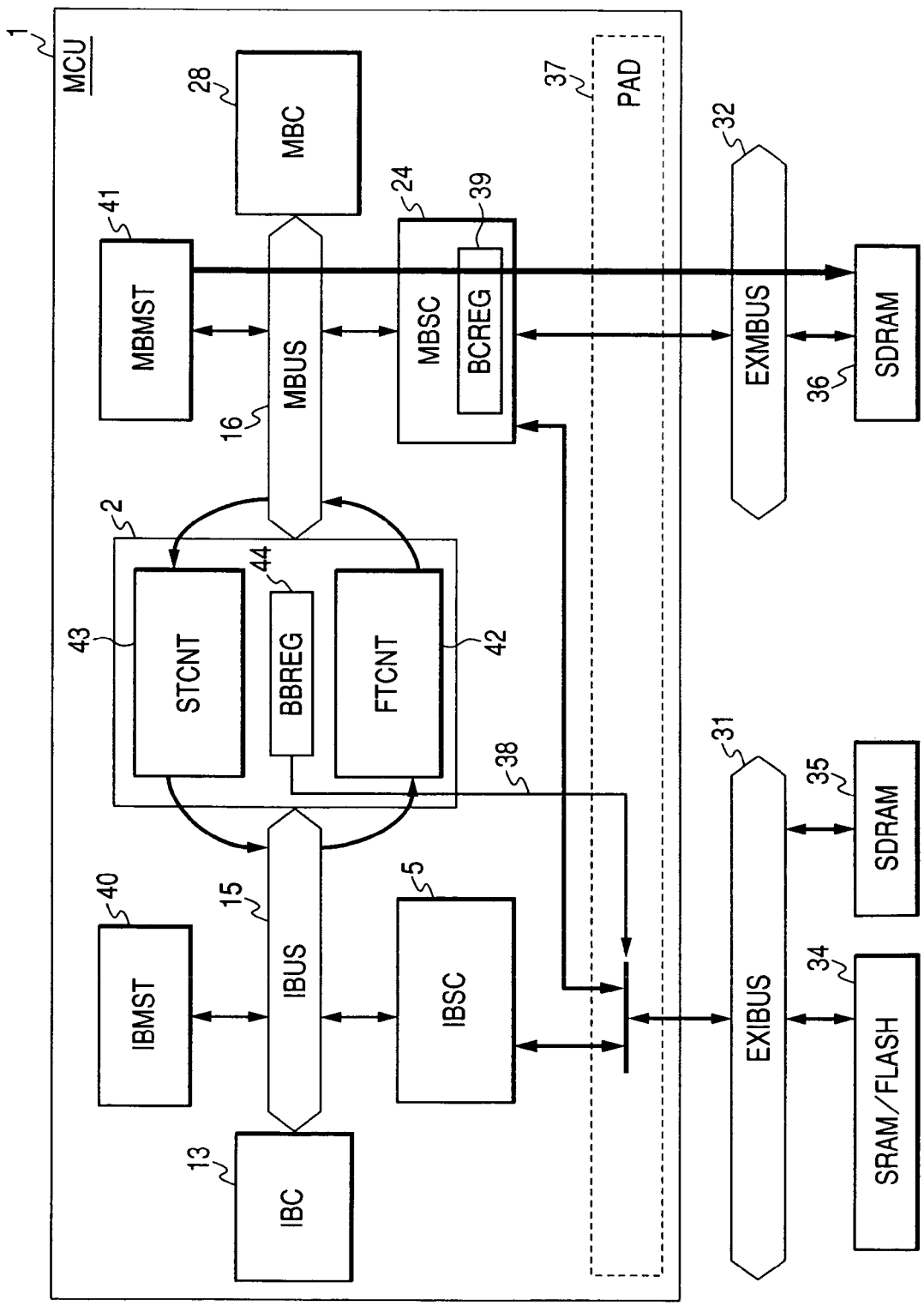
FIG. 7 is a block diagram illustrating an access path at the time of accessing the SDRAM from the MBMST in the 16-bit bus mode.

FIG. 7 illustrates an access path used to access the SDRAM 36 from the MBMST 41 in the 16-bit bus mode.

Figure 8:
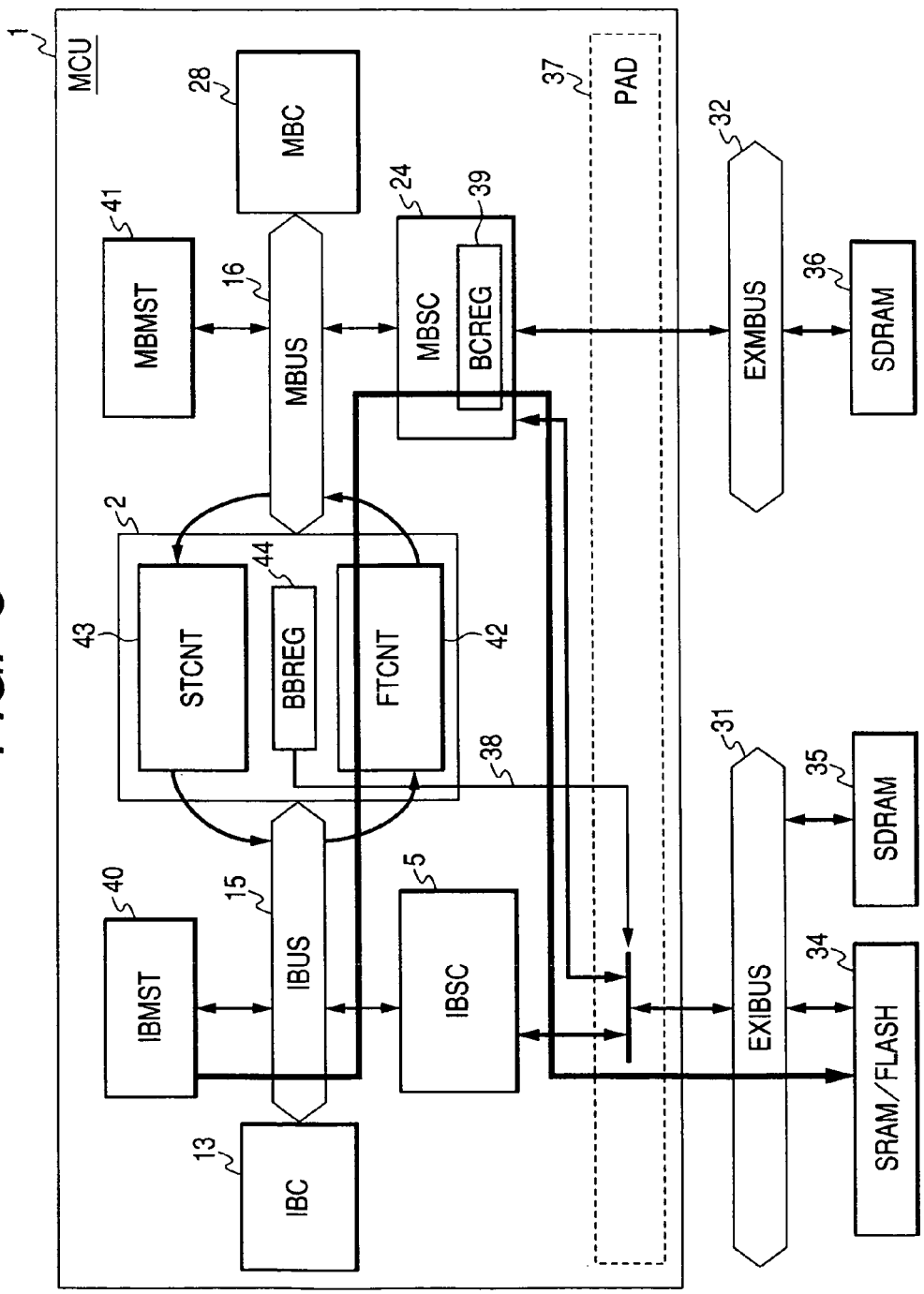
FIG. 8 is a block diagram illustrating an access path at the time of accessing an asynchronous memory from the IBMST via the FTCNT in a 32-bit bus mode.

FIG. 8 illustrates an access path used to access the asynchronous memory 34 from the IBMST 40 via the FTCNT 42 in the 32-bit bus mode. The data size of an access to the asynchronous memory 34 is 16 bits.

Figure 9:
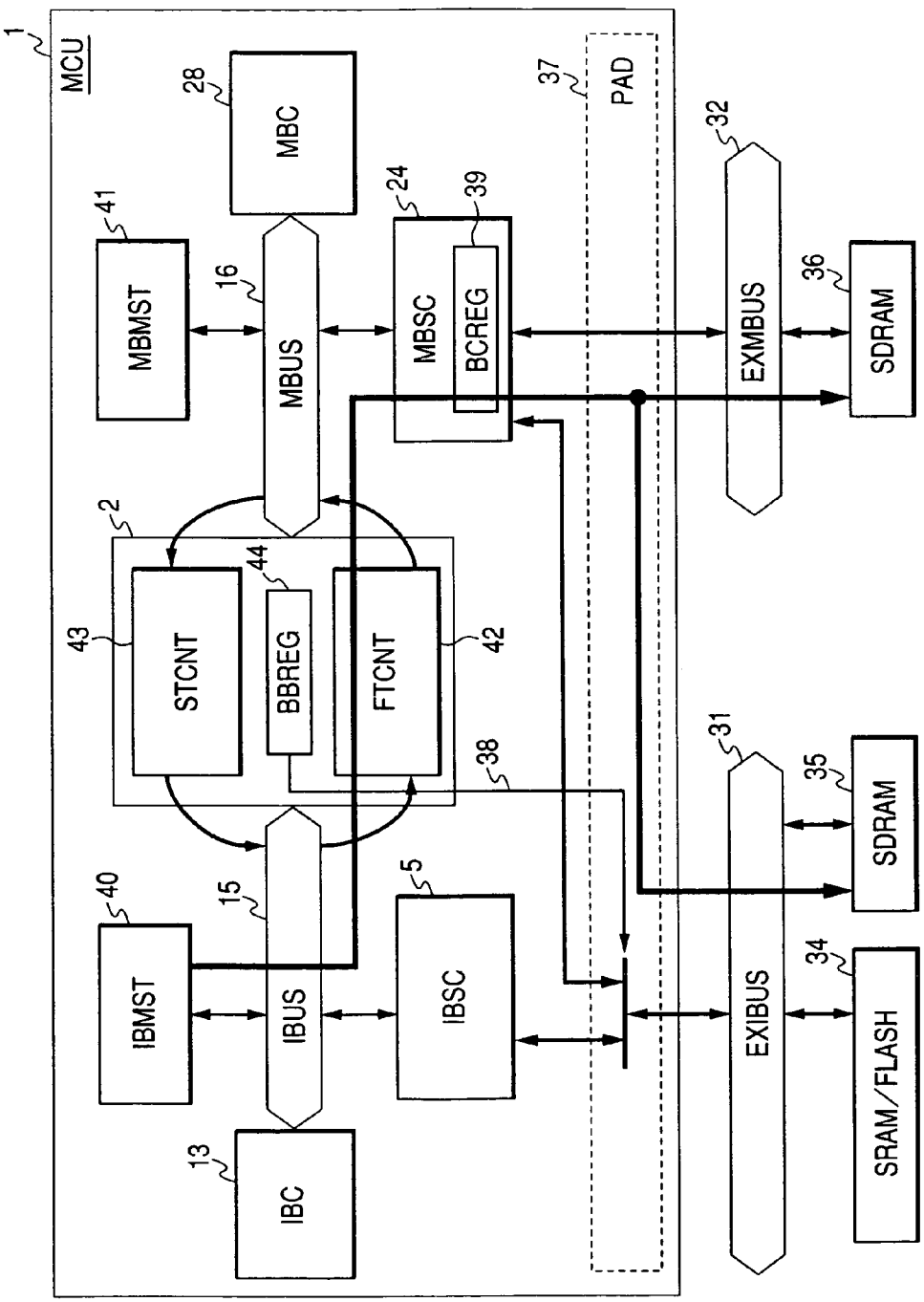
FIG. 9 is a block diagram illustrating an access path at the time of parallel-accessing SDRAMS from the IBMST via the FTCNT in the 32-bit bus mode.

FIG. 9 illustrates an access path used to parallel-access the SDRAMs 35 and 36 from the IBMST 40 via the FTCNT 42 in the 32-bit bus mode. The data size of an access to the SDRAMs 35 and 36 is 32 bits.

Figure 10:
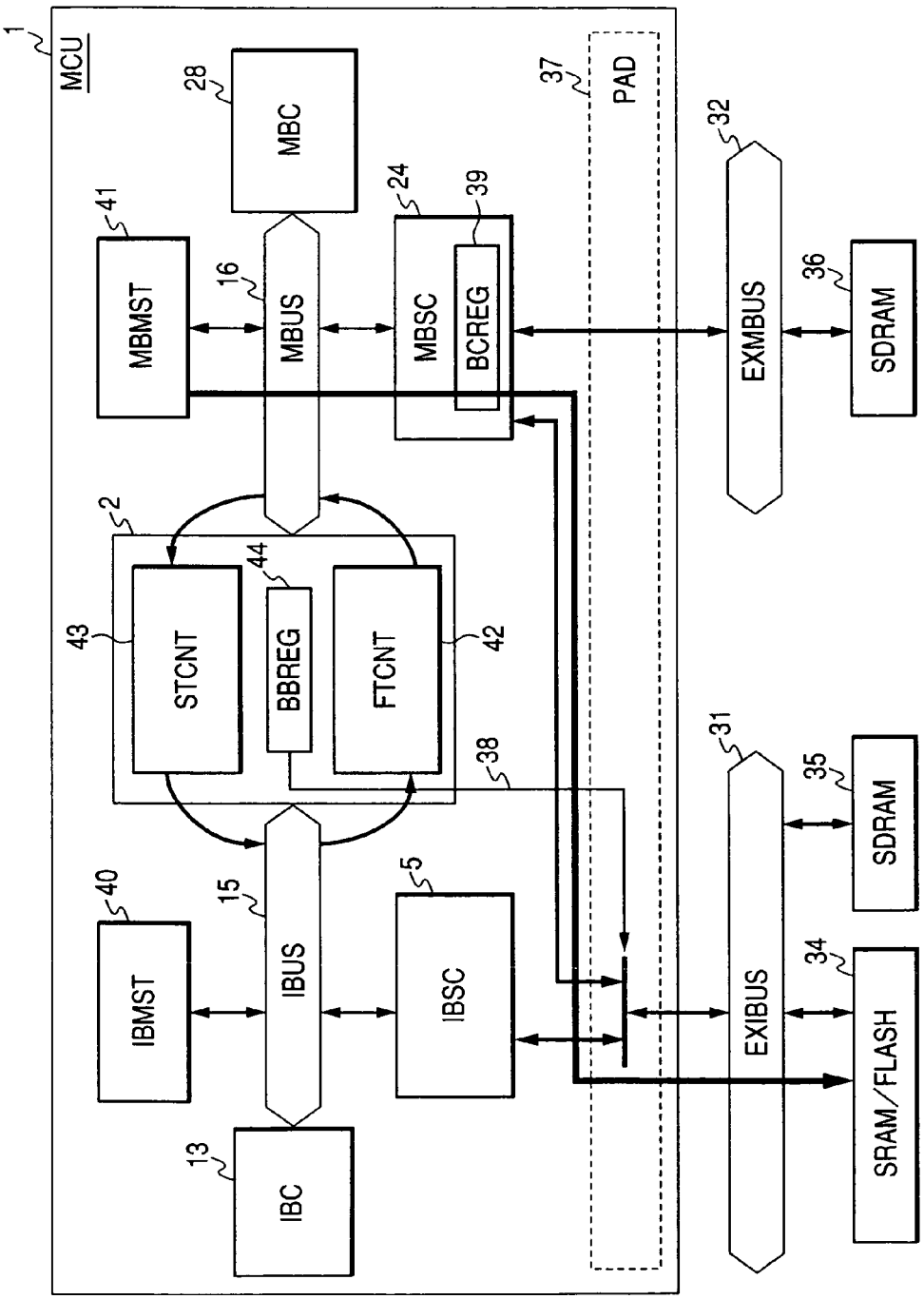
FIG. 10 is a block diagram illustrating an access path at the time of accessing the asynchronous memory from the MBMST in the 32-bit bus mode.

FIG. 10 illustrates an access path used to access the asynchronous memory 34 from the MBMST 41 in the 32-bit bus mode. The data size of an access to the asynchronous memory 34 is 16 bits.

Figure 11:
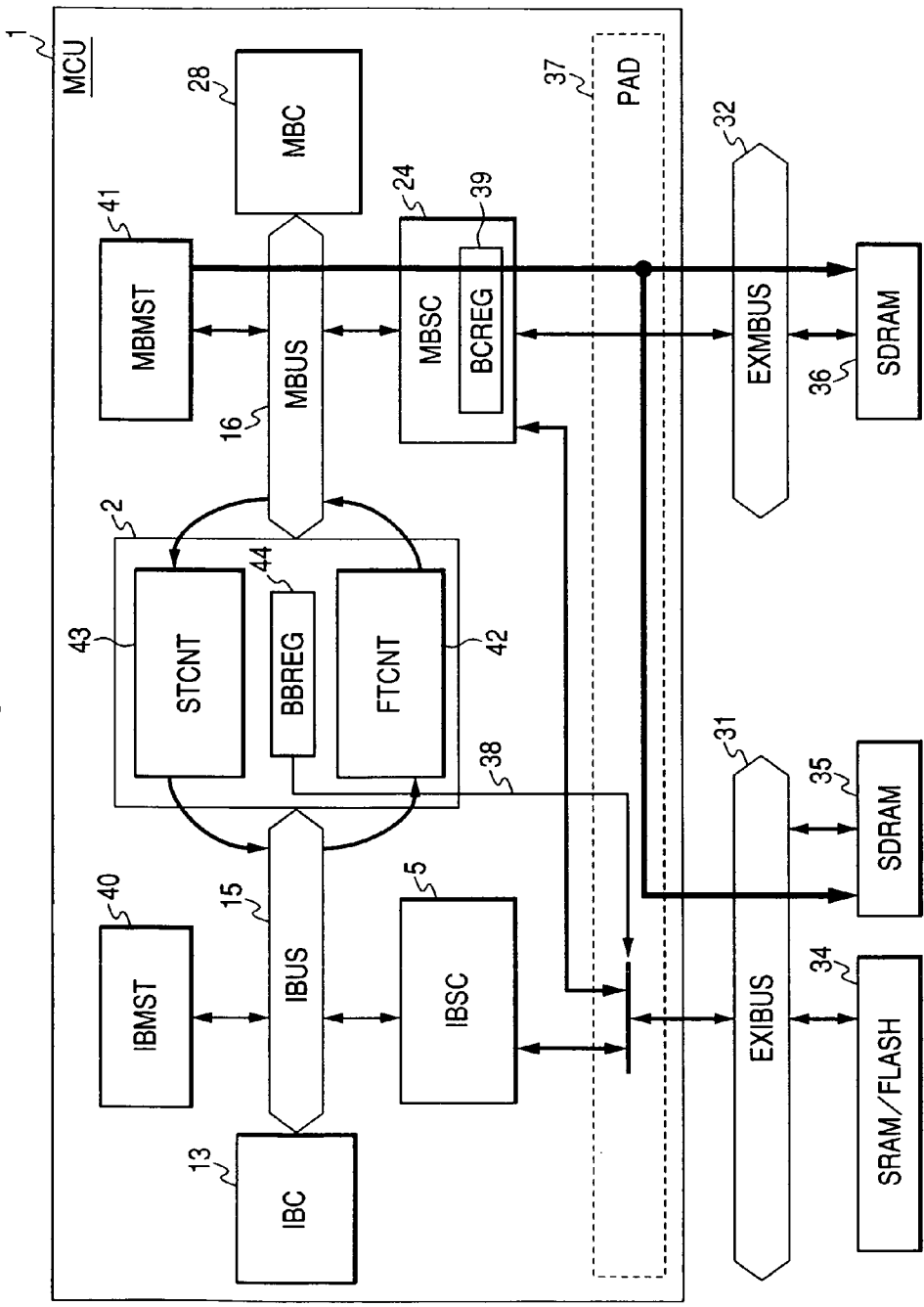
FIG. 11 is a block diagram illustrating an access path at the time of parallel-accessing SDRAMs from the MBMST in the 32-bit bus mode.

FIG. 11 illustrates an access path used to parallel-access the SDRAMs 35 and 36 from the MBMST 41 in the 32-bit bus mode. The data size of an access to the SDRAMs 35 and 36 is 32 bits.

Avoidance of Access Contention Between Internal Buses

Figure 12:
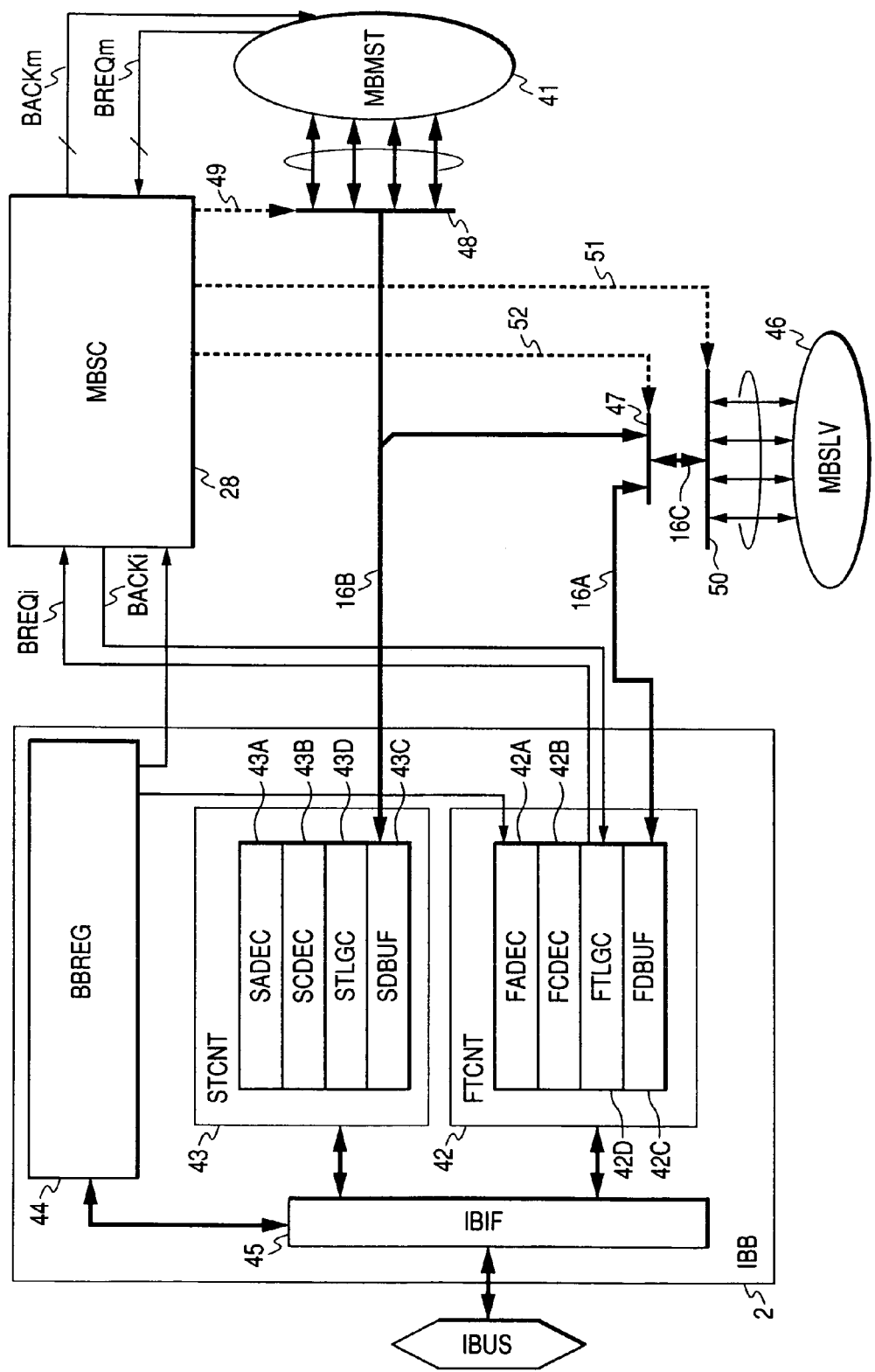
FIG. 12 is a block diagram specifically showing a connection between an IBB and an MBUS.

FIG. 12 more specifically shows a connection between the IBB 2 and the MBUS 16. The IBB 2 has the FTCNT 42 and STCNT 43 as described above.

The FTCNT 42 is a circuit that is used for transferring an access request or the like from the IBMST 40 to a bus slave (MBSLV) 46 of the MBUS 16, and it has an address decoder (FADEC) 42A, a command decoder (FCDEC) 42B, a data buffer (FDBUF) 42C, and a transfer control logic (FTLGC) 42D. The FTCNT 42 functions as a bus master port of the MBUS 16 and a bus slave port of the IBUS 15. The FTCNT 42 outputs a bus request signal BREQi to the MBC 28, and it receives a bus acknowledge signal BACKi from the MBC 28. BREQm generically indicates bus request signals output from the MBMST 41, and BACKm generically indicates bus acknowledge signals supplied from the MBC 28 to the MBMST 41.

The STCNT 43 is a circuit for transferring an access request or the like from the MBMST 41 to a bus slave of the IBUS 15, and it has an address decoder (SADEC) 43A, a command decoder (SCDEC) 43B, a data buffer (SDBUF) 43C, and a transfer control logic (STLGC) 43D. The STCNT 43 functions as a bus slave port of the MBUS 16 and a bus master port of the IBUS 15. Although not shown, the STCNT 43 outputs a bus request signal to the IBC 13 via a bus interface (IBIF) 45 and receives a bus acknowledge signal from the IBC 13.

The MBUS 16 has a first split bus 16A connected to the FTCNT 42, a second split bus 16B connecting the MBMST 41 and the STCNT 43, a third split bus 16C connected to the bus slave (MBSLV) 46 of the MBUS 16, and a split bus connection selecting circuit 47 for selectively connecting either the first split bus 16A or the second split bus 16B to the third split bus 16C. In FIG. 12, each of the access ports of the MBMST 41 is connected to a selector 48 via a dedicated line, and one access port selected by the selector 48 is connected to the second split bus 16B. An access port selected by the selector 48 corresponds to an access port of the bus master 41 whose bus right is approved by a bus acknowledge signal BAQCKm, and the selecting control is performed by the MBC 28 with a control signal 49. Similarly, each of the access ports of the MBSLV 46 is connected to a selector 50 via a dedicated line, and one access port selected by the selector 50 is connected to the third split bus 16C. The MBC 28 receives and decodes an access address to be supplied to the split bus 16B and an access address to be supplied to the split bus 16A, and it grasps a slave port, to be accessed, of the MBSLV 46. Based on the slave port, the MBC 28 performs selection control on the selector 50 with a control signal 51 and connects the slave port, to be accessed, of the MBSLV 46 to the third split bus 16C.

The split bus connection selecting circuit 47 is subjected to selection control by a selection signal 52 that is output from the MBC 28. When a bus acknowledge is sent by the bus acknowledge signal BACKi in response to a bus access request from the FTCNT 42 side, the MBC 28 selects the first split bus 16A. When a bus acknowledge is sent by the bus acknowledge signal BACKm in response to a bus access request from the MBMST 41 side, the MBC 28 selects the second split bus 16B. When a bus access right request of the signal BREQi from the FTCNT 42 and a bus right request of the signal BREQm from the MBMST 41 contend with each other, although the invention is not so limited, priority is given to the bus access request of the signal BREQi, bus right approval is given with the signal BACKi to the FTCNT 42 side, and the first split bus 16A is connected to the MBSLV 46 via the third split bus 16C by the split bus connection selecting circuit 47 in response to the control signal 52.

With this configuration, when a situation occurs in which an access request to the MBSLV 46 via the FTCNT 42 from the IBUS 15 side and an access request of the signal BREQm from the MBMST 41 contend with each other, the transmission path of both of the access requests can be split to a first path of the first split 16A and a second path of the second split bus 16B. By giving priority to the access request of BREQi in an algorithm, collision with the other access request BREQm can be avoided. Even if the access requests contend with each other between the buses, no dead lock occurs. By giving priority to the access request of BREQi, the processor core can set or rewrite control data for image processing by taking priority over a process of an image processing module.

Figure 13:
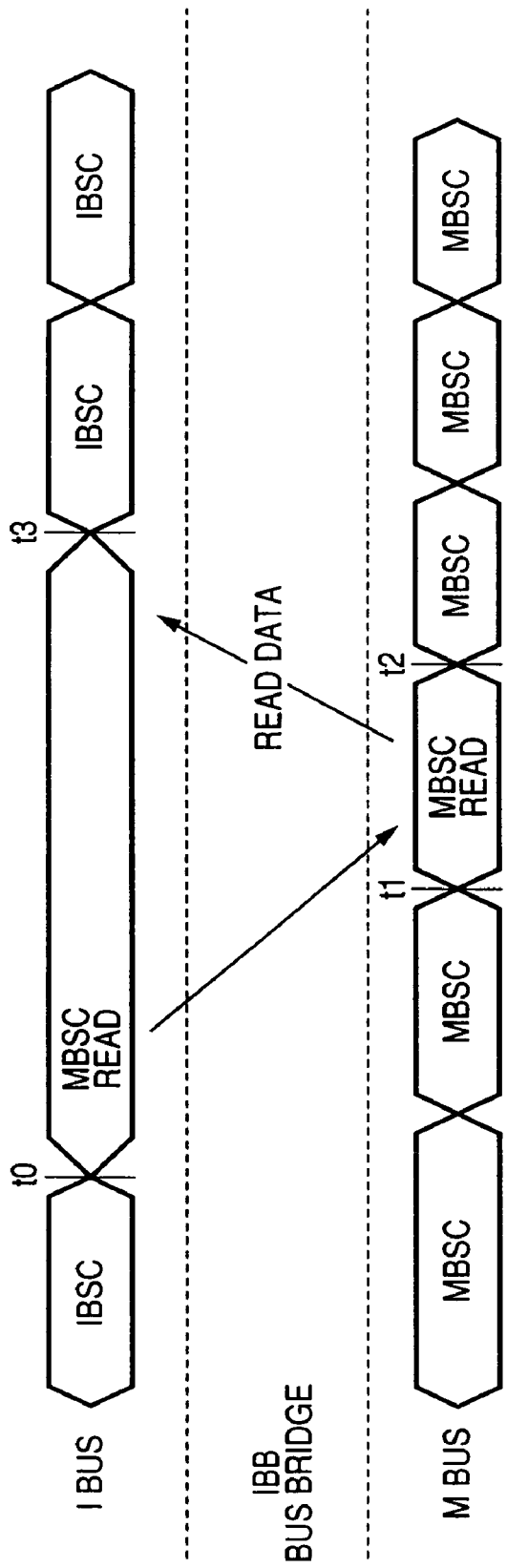
FIG. 13 is a timing chart illustrating reading operation timings of an IBUS and MBUS via a bus bridge circuit.
Figure 14:
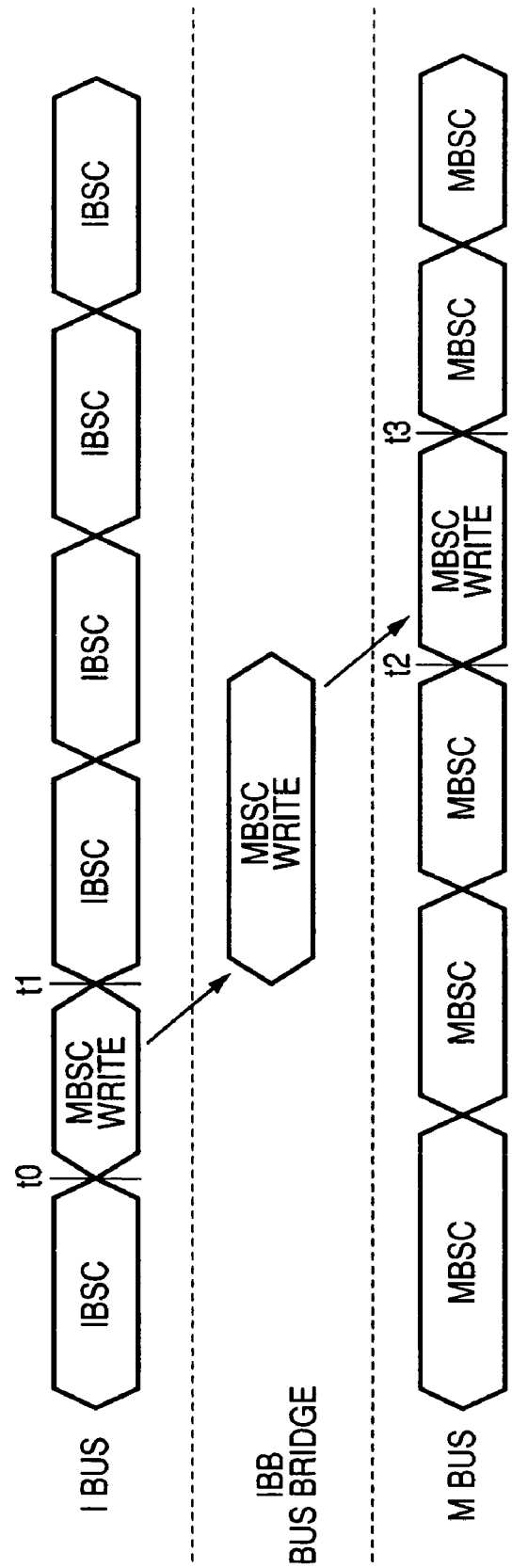
FIG. 14 is a timing chart illustrating writing operation timings of the IBUS and MBUS via the bus bridge circuit.

FIG. 13 shows the timings of reading operations between the IBUS 15 and the MBUS 16 via the bus bridge circuit 2. FIG. 14 similarly shows timings of writing operations. In both of these diagrams, IBSC denotes an external bus access using the IBSC 5, and MBSC denotes an external bus access using the MBSC 24.

When an access request from the IBMST 40 to the MBSLV 46 is generated and the access request to the MBSLV 46 is output to the IBUS 15, the bus bridge circuit 2 asserts the bus request signal BREQi to the MBUS 16, obtains the bus right by the bus acknowledge signal BACKi, and starts the operation of transferring an access address, an access command, or the like to the MBUS 16. In the case of a read access, as shown in FIG. 13, a read access on the IBUS 15 starting at time t0 has to be maintained until time t3, during which time read data is returned to the IBUS 15. During this period, the IBUS 15 is continuously occupied by the read access. In the case of a write access, since the bus bridge circuit 2 has the data buffers 42C and 43C, which are capable of temporarily holding write data, the write access on the IBUS 15 does not have to be continued until the time t3 by which the writing operation on the MBUS 16 is completed. Therefore, without waiting for completion of the writing operation on the MBUS 16 at the time t3, the next access can start from time t1 on the IBUS 15.

Figure 15:
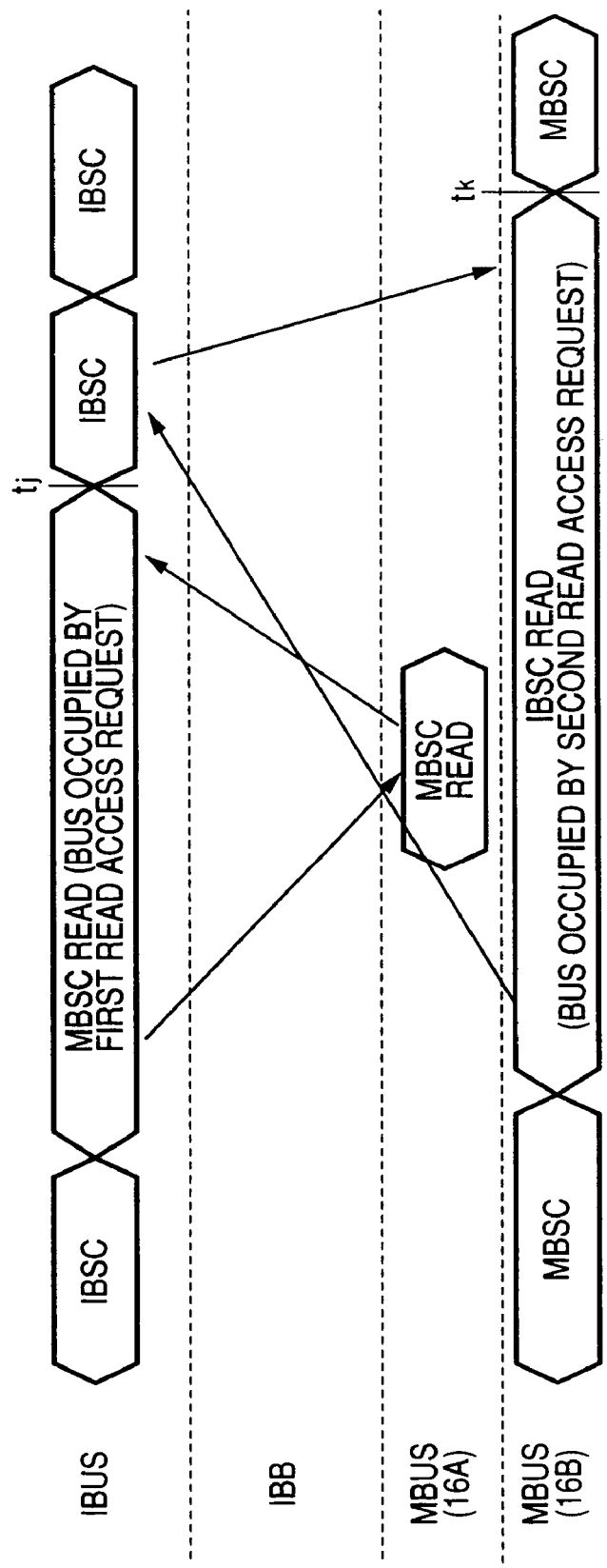
FIG. 15 is a timing chart showing operation timings when contention occurs between a first read access request from the IBMST to the MBSLV and a second read access request from the MBMST to the bus slave side of an IBUS.

FIG. 15 shows operation timings when a first read access request from the IBMST 40 to the MBSLV 46 and a second read access request from the MBMST 28 to the bus slave side of the I bus contend with each other. By the first read access request from the IBMST 40 to the MBSLV 46 side, a read access address, a read access command, and the like are transferred to the IBUS 15. By the second read access request from the MBMST 28 to the bus slave side of the IBUS 15, a read access address, a read access command, and the like are transferred to the second split bus 16B of the MBUS 16. Access control information, such as the access address of the former first read access request, is transferred to the bus 16A that is split from the bus 16B. Even when priority is given to the former first read access request and the process is performed, the first read access request does not collide with access control information, such as a read access address of the second split bus 16B. Read data is transferred (tj) to the IBUS 15 via the split bus 16A in response to the first read access request. After that, a read access of the second read access request is made by the IBUS 15. Read data is transferred to the split bus 16B of the MBUS 16, and the reading operation in response to the second read access request is completed (tK). Therefore, as typified by the first and second read access requests, even when the access request from the IBUS 15 and the access request from the MBUS 16 contend with each other, the process is performed normally without causing a dead lock.

Figure 16:
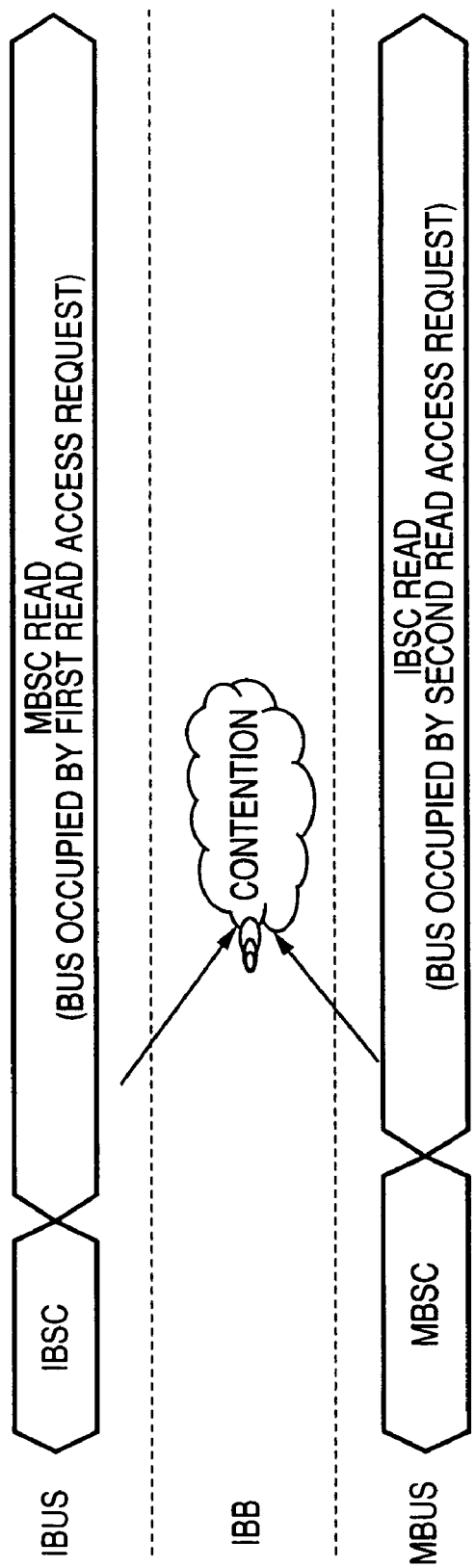
FIG. 16 is a timing chart showing an access contention state on assumption that the MBUS is a common bus like an IBUS.

FIG. 16 shows an access contention state on assumption that the MBUS 16 is also a common bus like the IBUS 15. When the IBUS 15 side is occupied by a first read access and the MBUS 16 side is occupied by a first read access, since both of the buses are common buses, collision of access control information of the access requests cannot be avoided. In such a state, a dead lock occurs. In order to avoid this undesirable situation, one of the bus access requests has to be withdrawn, and data access is delayed. Moreover, an exceptional post process, such as a process for a data error and retry, becomes necessary and the process is complicated.

A specific example of a voice process and an image process using the microcomputer of FIG. 1, having the above-described bus configuration, will now be described.

Figure 17:
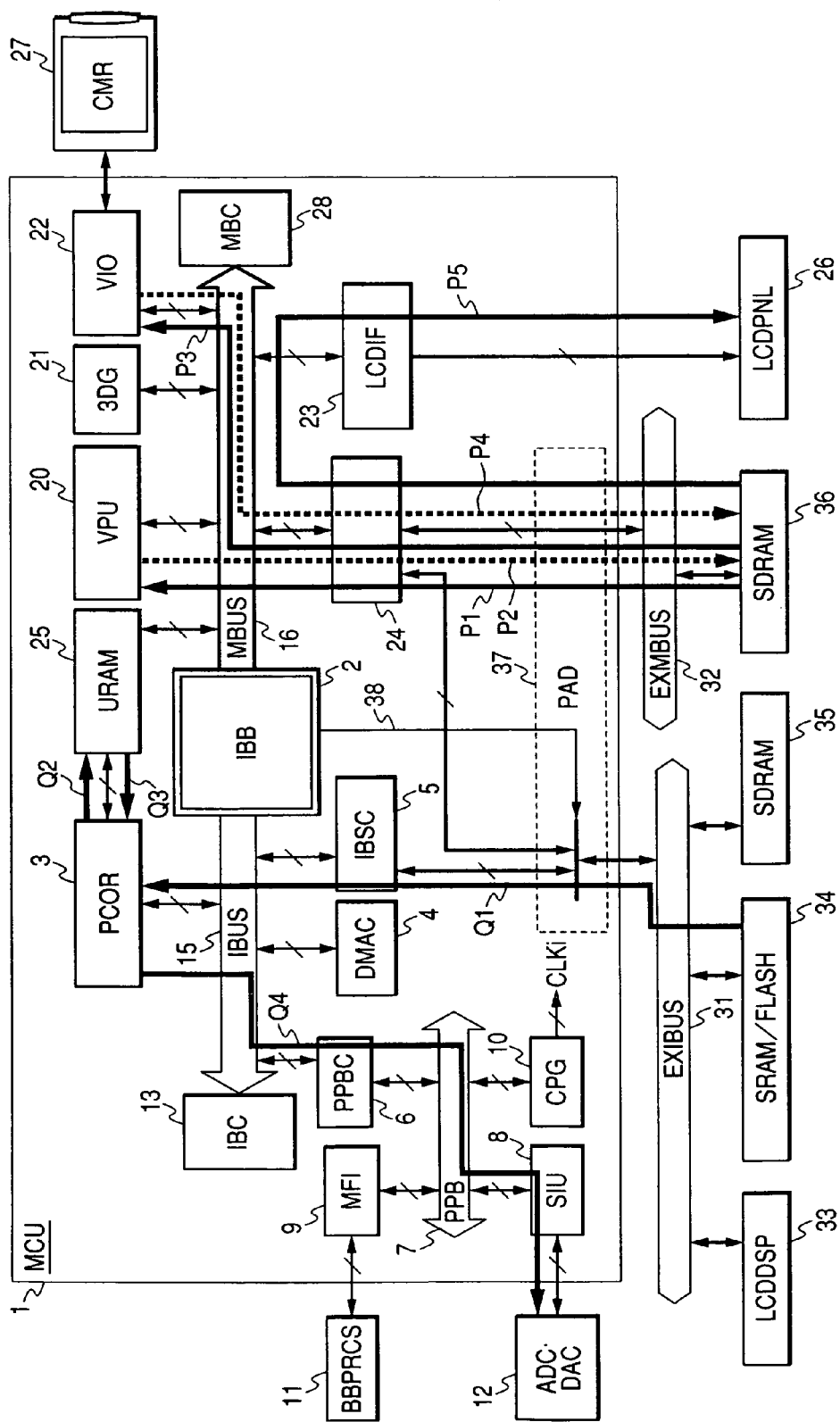
FIG. 17 is a block diagram showing an example of the case of performing motion picture reproduction and sound reproduction in the 16-bit bus mode.

FIG. 17 shows an example in the case of performing motion picture reproduction and voice reproduction in the 16-bit bus mode. The motion picture process (playback) will be described. Motion picture data used for the motion picture process is latched by, for example, the CCD camera (CMR) 27 that is connected to the video interface 22 or to another interface circuit, and the data is stored into the SDRAM 36. The data stored in the SDRAM 36 is read by the VPU 20 (P1). The VPU 20 decodes the read data and stores the decoded data to the SDRAM 36 (P2). The VIO 22 reads the data decoded by the VPU 20 from the SDRAM 36 and performs an image turning process, filter process, and the like (P3). The processed data is stored in the SDRAM 36 (P4). The data stored in P4 is read by the LCDIF 23 and output to the LCDPNL 26 (P5). The voice process (playback) will be described. Voice data used for the voice process is latched by, for example, the ADC 12 or another interface circuit that is capable of latching voice data, and the data is stored into the asynchronous memory 34. The PCOR 3 reads the voice data from the asynchronous memory 34 (Q1). The PCOR 3 develops the read voice data to the URAM 25 (Q2). The PCOR 3 performs a digital signal process on the developed voice data (Q3). The result of this process is sent to the SIU 8, and voice is reproduced via the ADC and DAC 12 (Q4).

Figure 18:
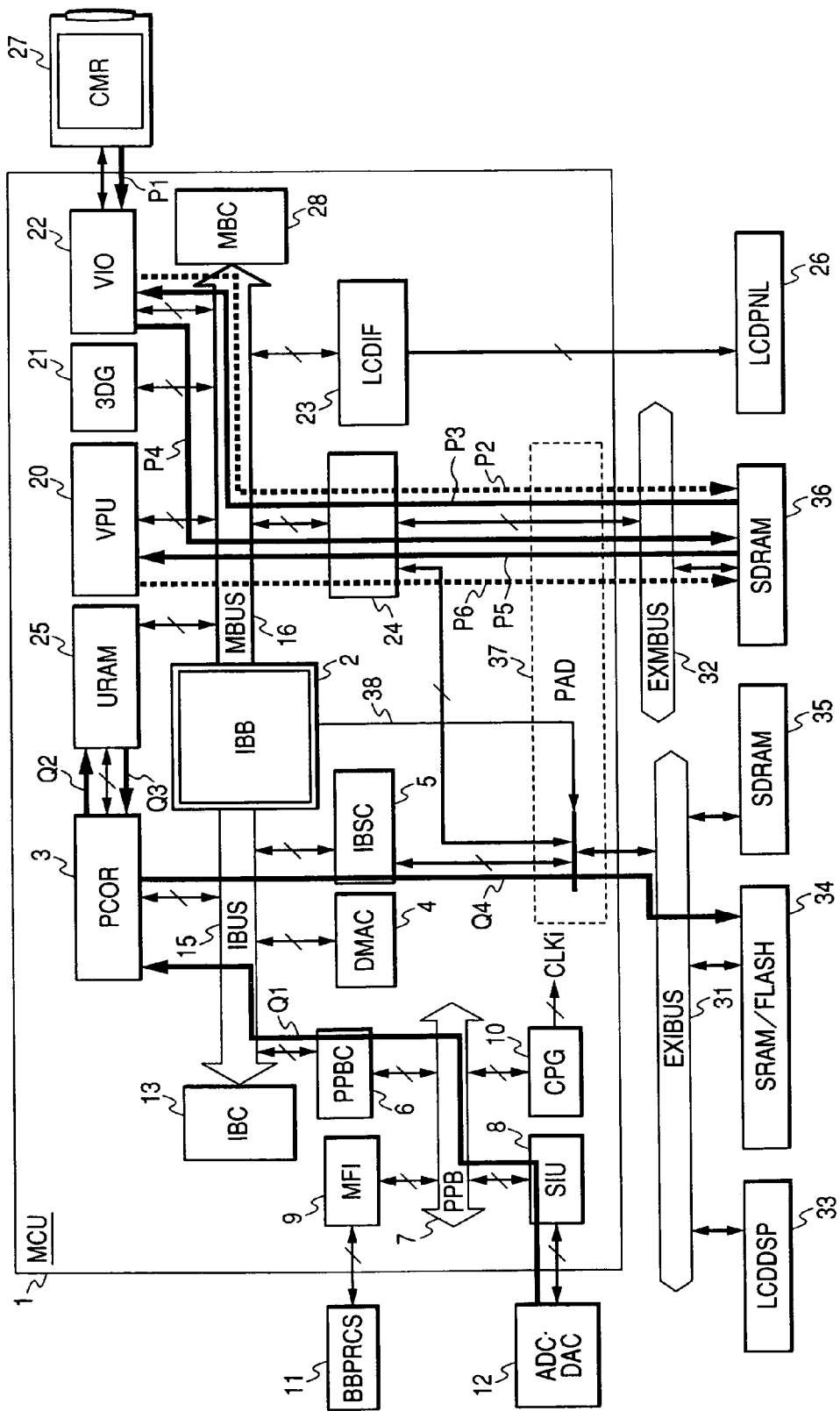
FIG. 18 is a block diagram showing another example of the case of performing motion picture reproduction and sound reproduction in the 16-bit bus mode.

FIG. 18 shows another example in the case of performing motion picture reproduction and voice reproduction in the 16-bit bus mode. The motion picture process (playback) will be described. Image data is captured from the CMR 27 (P1). The captured data is stored into the SDRAM 36 (P2). The VIO 22 reads the data stored in P2 and performs an image turning process, filter process, and the like (P3). The processed data is stored in the SDRAM 36 (P4). The VPU 20 reads the data stored in P4 and performs, for example, an encoding process of MPEG4 (P5). The encoded data is stored in the SDRAM 36 (P6). The voice process (playback) will be described. Voice data is read from the SIU 8 (Q1). The read voice data is developed to the URAM 25 (Q2). The PCOR 3 performs a computing process on the developed data (Q3). The result of the computing process is stored in the asynchronous memory 34 (Q4).

Figure 19:
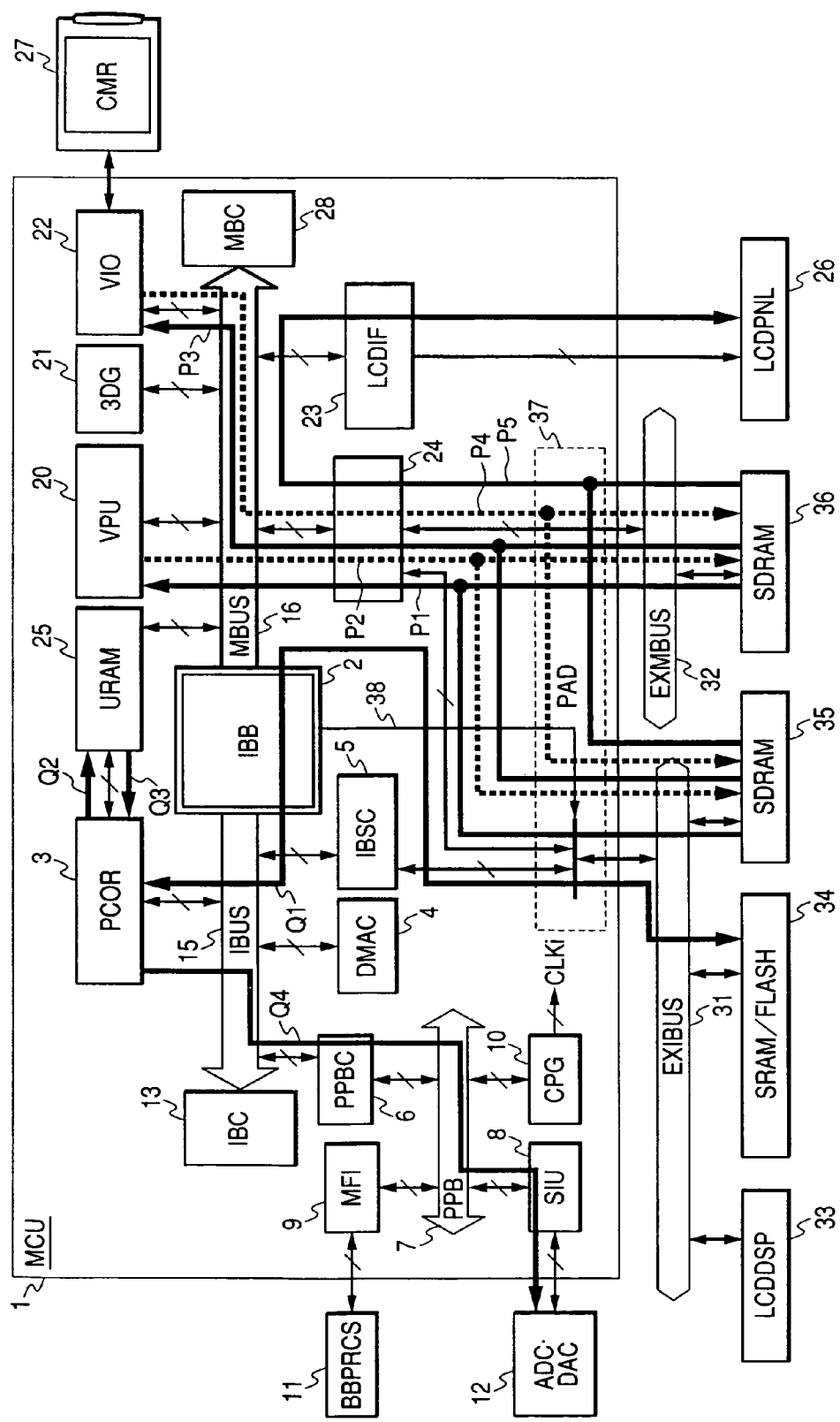
FIG. 19 is a block diagram showing an example of the case of performing motion picture reproduction and sound reproduction in the 32-bit bus mode.

FIG. 19 shows another example in the case of performing motion picture reproduction and voice reproduction in the 32-bit bus mode. The motion picture process (playback) will be described. Image data stored in the SDRAMs 35 and 36 are captured in the 32-bit width by the VPU 20 (P1). The VPU 20 decodes the captured data and stores the decoded data in the 32-bit width into the SDRAMs 35 and 36 (P2). The VIO 22 reads the data decoded by the VPU 20 from the SDRAMs 35 and 36 and performs an image turning process, filter process, and the like (P3). The processed data is stored in the 32-bit width in the SDRAMs 35 and 36 (P4). The LCDIF 23 reads the data stored in P4 in the 32-bit width from the SDRAMs 35 and 36, and the data is output to the LCDPNL 26 (P5). The voice process (playback) will be described. The PCOR 3 reads voice data from the asynchronous memory 34 (Q1). The PCOR 3 develops the read voice data to the URAM 25 (Q2). The PCOR 3 performs a digital signal process on the developed voice data (Q3). The result of the process is sent to the SIU 8, and the voice is reproduced via the ADC and DAC 12 (Q4).

Figure 20:
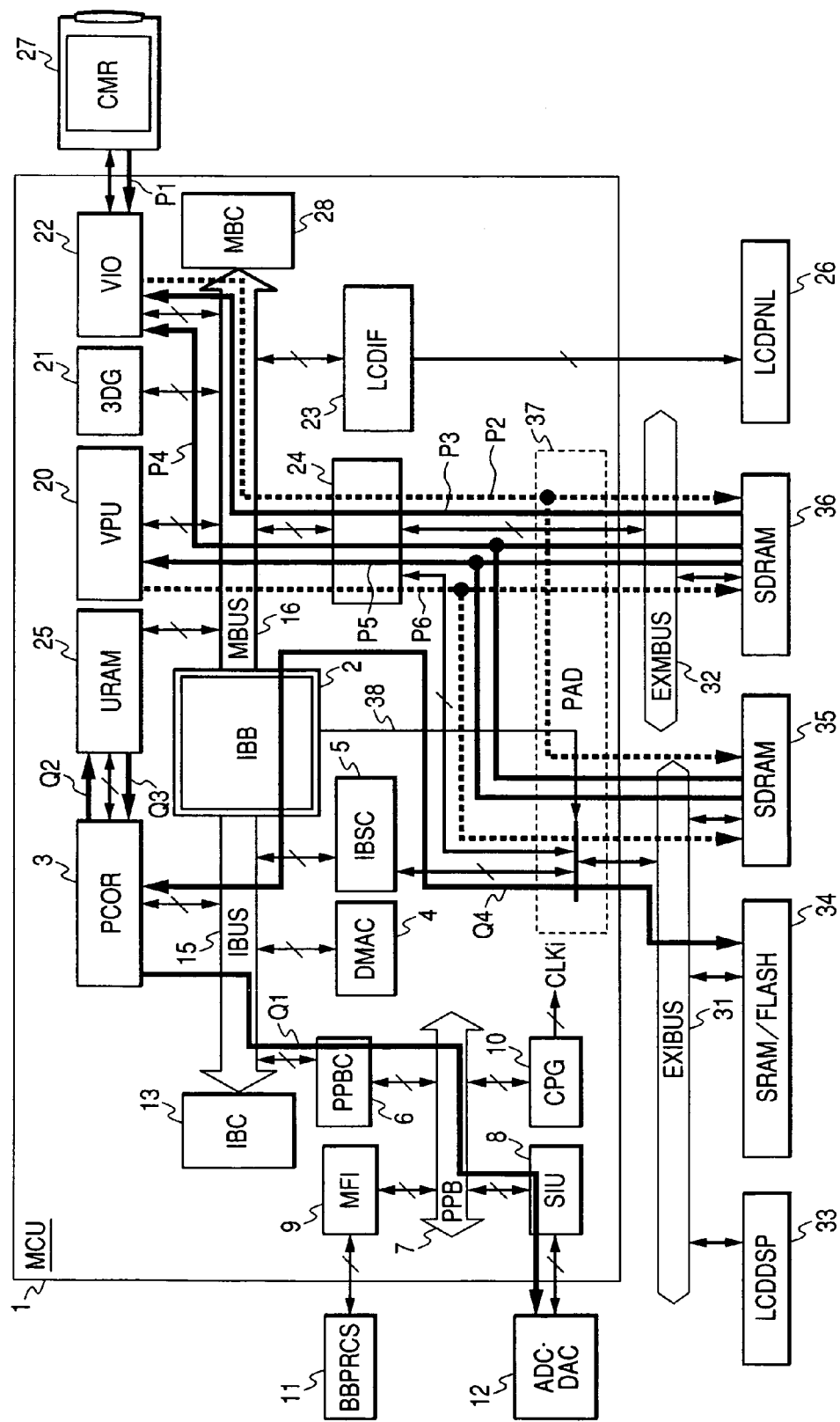
FIG. 20 is a block diagram showing another example of the case of performing motion picture reproduction and sound reproduction in the 32-bit bus mode.

FIG. 20 shows another example in the case of performing motion picture reproduction and voice reproduction in the 32-bit bus mode. The motion picture process (playback) will be described. Image data is captured from the CMR 27 (P1). The captured data is stored in the 32-bit width into the SDRAMs 35 and 36 (P2). The VIO 22 reads the data stored in P2 from the SDRAMs 35 and 36 and performs an image turning process, filter process, and the like (P3). The processed data is stored in the 32-bit width into the SDRAMs 35 and 36 (P4). The VPU 20 reads the data stored in P4 parallelly from the SDRAMs 35 and 36 and performs, for example, an encoding process of MPEG4 (P5). The encoded data is stored in parallel into the SDRAMs 35 and 36 (P6). The voice process (playback) will be described. Voice data is read from the SIU 8 (Q1). The read voice data is developed to the URAM 25 (Q2). The PCOR 3 performs a computing process on the developed data (Q3). The result of the computing process is stored in the asynchronous memory 34 (Q4).

In the image process of FIGS. 17 and 18, the SDRAM 36 is accessed on the 16-bit parallel data unit basis. In the image process of FIGS. 19 and 20, the SDRAMs 35 and 36 are accessed in parallel on the 32-bit parallel data unit basis. In the case of processing a large amount of image data, a large difference occurs in the image process time between the image processes. The image process and voice process in FIGS. 17 to 20 can be performed in parallel. Although the memory access for performing an image process is performed very efficiently in the 32-bit bus mode, the memory accesses for the image process and the voice process are not performed perfectly in parallel.

The microcomputer described above can execute the CPU process by the PCOR 3 and the image process by the VPU 20, 3DG 21, and the like in parallel. Since the MBUS 16 can be used as a bus dedicated to the image process, the bus performance improves. In the 32-bit bus mode, the bus load by the SDRAM access for the image process can be reduced almost by half. It is suitable to select the 16-bit bus mode in the case of placing importance on the CPU process and to select the 32-bit bus mode in the case of placing importance on the image process. By operating the BBREG 44, the bus mode can be dynamically changed in accordance with the data process. The optimum assignment of the memory space can be selected in accordance with the application of the user of the microcomputer 1. Because of reduction in the bus load at the time of an image process, the frame rate of an image improves, and it can facilitate a large-screen process. Thus, the data process efficiency in applications requiring parallel process of the voice process by the CPU and the image process by the image processing module, for example, in a motion picture capturing mode in a cellular phone, can be improved.

Although the invention achieved by the inventors herein has been described above on the basis of various embodiments, obviously, the invention is not limited to the foregoing embodiments, but can be variously changed without departing from the gist of the invention.

For example, a bus master and a bus slave of a bus connected via a bus bridge circuit are not limited to the CPU and the image processing module, but can be variously changed. The external memory is not limited to the SDRAM, but may be a clock synchronous memory, such as a synchronous SRAM or a clock asynchronous memory. The SDRAM may be a memory of a single data rate or a clock synchronous memory of a double data rate or the like. Although a configuration in which the 32-bit bus mode is set and register setting of the memory controller is made to thereby instruct a parallel 32-bit access to a plurality of SDRAMs has been described above, the parallel 32-bit access may be automatically instructed only by setting the 32-bit bus mode.

What is claimed is:

1. A data processor comprising:
   a first bus;
   a first bus master module connected to said first bus;
   a first bus slave module connected to said first bus;
   a second bus;
   a second bus master module connected to said second bus;
   a second bus slave module connected to said second bus;
   a bus bridge circuit connecting said first and second buses;
   a first bus right arbitrating circuit connected to said first bus; and
   a second bus right arbitrating circuit connected to said second bus,
   wherein said bus bridge circuit has:
      a first transfer controller for obtaining bus right of the second bus in response to an access request directed from the first bus to the second bus and performing transfer control on information of the request; and
      a second transfer controller for obtaining bus right of the first bus in response to an access request directed from the second bus to the first bus and performing transfer control on information of the request, and
   wherein said second bus has first and second paths which can be split, the first path connecting said second bus slave module and said first transfer controller, and the second path connecting said second bus master module and said second transfer controller.

2. The data processor according to claim 1,
   wherein said second bus has a first split bus connected to said first transfer controller, a second split bus connecting said second bus master module and said second transfer controller, a third split bus connected to said second bus slave module, and a split bus connection selecting circuit for selectively connecting either said first or second split bus to said third split bus,
   wherein said first path includes said first split bus, split bus connection selecting circuit, and third split bus, and
   wherein said second path includes said second split bus.

3. The data processor according to claim 2, wherein when a bus right request via the first transfer controller and a bus right request from the second bus master module contend with each other, said second bus right arbitrating circuit places priority on the bus right request via the first transfer controller, and makes said split bus connection selecting circuit select a connection state of connecting the first split bus to the third split bus.

4. The data processor according to claim 3, wherein said first bus master module is a processor core, and said second bus master module is an image processing module.

5. The data processor according to claim 3,
wherein said first bus slave module is a first bus controller for receiving an access request transmitted on said first bus and controlling a first external bus, and
wherein said second bus slave module is a second bus controller for receiving an access request transmitted on said second bus and controlling a second external bus.

6. The data processor according to claim 5,
further comprising an external bus connection selecting circuit capable of selecting a connection state between said first and second bus controllers and an external bus,
wherein said external bus connection selecting circuit can select a first connection state in which the first external bus is connected to said first bus controller and the second external bus is connected to said second bus controller, or a second connection state in which the first and second external buses are connected to said second bus controller, and the first and second external buses are not connected to said first bus controller, and
wherein in said second connection state, said second bus controller can perform a parallel access control and an individual access control on said first and second external buses.

7. The data processor according to claim 6,
wherein said bus bridge circuit has a first operation mode and, in said first operation mode, in response to an access request given from said processor core to the first external bus, transfers information related to the access request to the second internal bus, and
wherein said external bus connection selecting circuit is set in said second connection state in response to said first operation mode.

8. The data processor according to claim 7, wherein said second bus controller performs said parallel access control when a specific address area is designated by an access request from said processor core or image processing module, and performs said individual access control when other address areas related to an external bus are designated.

9. The data processor according to claim 8, wherein in said first connection state, the first bus controller can perform the individual access control on the first external bus, and the second bus controller can perform the individual access control on the second external bus.

10. The data processor according to claim 7, wherein the bus bridge circuit has a register and, by setting a predetermined value in said register, said first operation mode is designated.

11. A data processor comprising:
a plurality of bus master circuits;
a plurality of external bus control circuits to which an access request is given from said bus master circuits; and
an external bus connection selecting circuit capable of selecting a state of connection between said plurality of external bus control circuits and the external buses,
wherein said external bus connection selecting circuit can select a first connection state in which a peculiar external bus is connected to each of the external bus control circuits or a second connection state in which external buses peculiar to the external bus control circuits are commonly connected to a predetermined external bus control circuit in said plurality of external bus control circuits, and
wherein in said second connection state, said predetermined external bus control circuit can perform the parallel access control and the individual access control on the external buses peculiar to said plurality of external bus control circuits.

12. The data processor according to claim 11, wherein said plurality of external bus control circuits can perform the individual access control on the peculiar external buses in said first connection state.

13. The data processor according to claim 12, wherein said predetermined external bus control circuit performs said parallel access control when a specific address area is designated by an access request from said bus master circuit, and performs said individual access control when other address areas related to the external buses are designated.

14. The data processor according to claim 13,
further comprising a plurality of internal buses connected via a bus bridge circuit,
wherein said bus master circuit and said external bus control circuit are connected to each of the internal buses, and the number of bits of said internal bus is many times larger than that of said external bus.

15. The data processor according to claim 14,
wherein said bus bridge circuit has a first operation mode and, in said first operation mode, in response to an access request given from an internal bus other than an internal bus connected to said predetermined external bus control circuit to an external bus peculiar to an external bus control circuit corresponding to the internal bus, said bus bridge circuit transfers information related to the access request to the internal bus connected to said predetermined external bus control circuit, and
wherein said external bus connection selecting circuit is set in said second connection state in response to said first operation mode.

16. A data processor comprising:
a first bus having 2n bits as the number of parallel data bits;
a first bus master module connected to said first bus;
a first bus controller capable of receiving an access request to be transmitted to said first bus and controlling a first external bus having n bits as the number of parallel data bits;
a second bus having 2n bits as the number of parallel data bits;
a second bus master module connected to said second bus;
a second bus controller capable of receiving an access request to be transmitted to said second bus and controlling a second external bus having n bits as the number of parallel data bits;
a bus bridge circuit connecting said first and second buses; and
an external bus connection selecting circuit capable of selecting a first connection state in which said first external bus is connected to said first bus controller and disconnected from said second bus controller or a second connection state in which said first external bus is connected to said second bus controller and disconnected from said first bus controller,
wherein in the second selection state of said external bus connection selecting circuit, said second bus controller can access a memory of the first external bus and a memory of a second external bus in parallel in response to an external bus access request of 2n bits as a data access size from said first or second bus master module.

17. The data processor according to claim 16, wherein in the second connection state of said external bus connection selecting circuit, said second bus controller can access the memory of the first external bus or the memory of the second external bus in response to an external bus access request of n bits as a data access size from said first or second bus master module, and wherein in the first connection state of said external bus connection selecting circuit, said first bus controller can access the memory of the first external bus in response to an external bus access request of n bits as a data access size from said first bus master module, and said second bus controller can access the memory of the second external bus in response to an external bus access request of n bits as a data access size from said second bus master module.

18. The data processor according to claim 17, wherein said bus bridge circuit has a first operation mode and, in said first operation mode, in response to an access request given from said first bus master module to a first external bus, said bus bridge circuit transfers information related to the access request to an internal bus connected to said second bus controller, and wherein said external bus connection selecting circuit is set in said second connection state in response to said first operation mode.

19. The data processor according to claim 18, wherein said first bus master module is a processor core, said second bus master module is an image processing module, and said processor core can set control information in said image processing module.

* * * * *